(12) United States Patent
Hafvenstein et al.

(10) Patent No.: US 12,311,907 B2
(45) Date of Patent: May 27, 2025

(54) ROUTING SYSTEM AND METHODS FOR AN AGRICULTURAL APPLICATOR

(71) Applicant: CNH Industrial America LLC, New Holland, PA (US)

(72) Inventors: David Hafvenstein, Benson, MN (US); Naga Venkata Prasanna Kumar Tallapalli, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 844 days.

(21) Appl. No.: 17/379,377

(22) Filed: Jul. 19, 2021

(65) Prior Publication Data

US 2022/0267996 A1 Aug. 25, 2022

Related U.S. Application Data

(60) Provisional application No. 63/151,921, filed on Feb. 22, 2021.

(51) Int. Cl.
*A01M 7/00* (2006.01)
*A01B 59/00* (2006.01)
(Continued)

(52) U.S. Cl.
CPC ......... *B60W 10/103* (2013.01); *A01B 59/002* (2013.01); *A01C 23/007* (2013.01); *A01C 23/008* (2013.01); *A01C 23/047* (2013.01); *A01D 41/1274* (2013.01); *A01D 69/00* (2013.01); *A01M 7/0042* (2013.01); *A01M 7/0057* (2013.01); *A01M 7/0085* (2013.01); *A01M 7/0089* (2013.01); *B05B 1/20* (2013.01); *B05B 12/02* (2013.01); *B05B 12/081* (2013.01); *B05B 12/085* (2013.01); *B05B 12/14* (2013.01); *B05B 12/16* (2018.02); *B05B 15/55* (2018.02); *B05B 15/65* (2018.02); *B08B 3/02* (2013.01); *B08B 5/02* (2013.01); *B60W 10/06* (2013.01);
(Continued)

(58) Field of Classification Search
CPC .......... A01M 7/0082; B60Y 2200/224; A01C 23/047; Y10T 137/6881; Y10T 137/6892; F16L 5/00; E02F 9/2275
See application file for complete search history.

(56) References Cited

U.S. PATENT DOCUMENTS 3,901,270 A 8/1975 Smith
3,999,784 A * 12/1976 Kennedy, Jr. ......... E02F 9/2275
248/65
(Continued)

*Primary Examiner* — Kevin F Murphy
(74) *Attorney, Agent, or Firm* — Rebecca Henkel; Peter K. Zacharias; Rickard K. DeMille

(57) ABSTRACT

A routing system for an agricultural sprayer includes a support configured to operably couple with the sprayer. An adaptor is configured to transfer a flow therethrough. The adaptor is at least partially positioned within an envelope defined between a wheel assembly and laterally offset components of the sprayer. A conduit has a first section operably coupled with a first portion of the adaptor and a second section operably coupled with an opposing second portion of the adaptor. The first section and the second section of the conduit are configured to transfer the flow therethrough such that the flow is serially transferred through each of the first section of the conduit, the adaptor, and the second section of the conduit.

13 Claims, 16 Drawing Sheets

(51) Int. Cl.

| | | |
|---|---|---|
| *A01C 23/00* | (2006.01) | |
| *A01C 23/04* | (2006.01) | |
| *A01D 41/127* | (2006.01) | |
| *A01D 69/00* | (2006.01) | |
| *B05B 1/20* | (2006.01) | |
| *B05B 12/02* | (2006.01) | |
| *B05B 12/08* | (2006.01) | |
| *B05B 12/14* | (2006.01) | |
| *B05B 12/16* | (2018.01) | |
| *B05B 15/55* | (2018.01) | |
| *B05B 15/65* | (2018.01) | |
| *B08B 3/02* | (2006.01) | |
| *B08B 5/02* | (2006.01) | |
| *B60W 10/06* | (2006.01) | |
| *B60W 10/103* | (2012.01) | |
| *B60W 10/18* | (2012.01) | |
| *B60W 30/18* | (2012.01) | |
| *B60W 40/076* | (2012.01) | |
| *B67D 7/02* | (2010.01) | |
| *B67D 7/36* | (2010.01) | |
| *B67D 7/38* | (2010.01) | |
| *B67D 7/78* | (2010.01) | |
| *B67D 99/00* | (2010.01) | |
| *E02F 3/46* | (2006.01) | |
| *E02F 9/22* | (2006.01) | |
| *F16L 3/22* | (2006.01) | |
| *G01M 3/32* | (2006.01) | |
| *G05D 1/00* | (2006.01) | |
| *G05D 1/223* | (2024.01) | |
| *G07C 5/00* | (2006.01) | |
| *G07C 5/08* | (2006.01) | |
| *B05B 14/00* | (2018.01) | |
| *G01F 23/70* | (2006.01) | |

(52) U.S. Cl.
CPC .......... *B60W 10/18* (2013.01); *B60W 10/182* (2013.01); *B60W 30/18118* (2013.01); *B60W 40/076* (2013.01); *B67D 7/02* (2013.01); *B67D 7/0294* (2013.01); *B67D 7/36* (2013.01); *B67D 7/362* (2013.01); *B67D 7/38* (2013.01); *B67D 7/78* (2013.01); *B67D 99/00* (2013.01); *E02F 3/46* (2013.01); *E02F 9/2271* (2013.01); *E02F 9/2275* (2013.01); *F16L 3/221* (2013.01); *G01M 3/3245* (2013.01); *G05D 1/0016* (2013.01); *G05D 1/223* (2024.01); *G07C 5/008* (2013.01); *G07C 5/08* (2013.01); *A01M 7/0082* (2013.01); *B05B 14/00* (2018.02); *B08B 2203/0205* (2013.01); *B60W 2520/10* (2013.01); *B60W 2552/15* (2020.02); *B60W 2720/10* (2013.01); *G01F 23/70* (2013.01)

(56) References Cited

U.S. PATENT DOCUMENTS

| | | | | |
|---|---|---|---|---|
| 4,156,436 | A | | 5/1979 | Hawk |
| 4,265,063 | A | | 5/1981 | Muller |
| 4,798,511 | A | * | 1/1989 | Kaczmarczyk ....... E02F 9/2275 414/815 |
| 5,622,392 | A | * | 4/1997 | Gochenouer ............. F16L 3/22 285/330 |
| 8,132,591 | B2 | * | 3/2012 | Nishino ................ E02F 9/2275 248/68.1 |
| 8,408,862 | B1 | | 4/2013 | Westendorf |
| 8,505,570 | B2 | | 8/2013 | Wimmer |
| 9,736,975 | B2 | | 8/2017 | Williams |
| 10,266,051 | B1 | * | 4/2019 | Trowbridge ........ A01M 7/0082 |

* cited by examiner

ROUTING SYSTEM AND METHODS FOR AN AGRICULTURAL APPLICATOR

CROSS-REFERENCE TO RELATED APPLICATIONS

This application is a non-provisional application claiming the benefit of priority under 35 U.S.C. § 119(e) to U.S. Provisional Application No. 63/151,921, filed Feb. 22, 2021, which is hereby incorporated by reference in its entirety.

FIELD

The present disclosure generally relates to agricultural sprayers for performing spraying operations within a field and, more particularly, to a routing system for various conduits of a sprayer.

BACKGROUND

Agricultural applicators or sprayers have been used within the industry for delivering an agricultural product to a ground surface of a field. The agricultural product may be in the form of a solution or mixture, with a carrier (such as water) being mixed with one or more active ingredients, such as a pesticide(s) (e.g., an herbicide(s), insecticide(s), rodenticide(s), etc.) and/or a nutrient(s). Typically, an applicator or sprayer is pulled as an implement or is self-propelled, and includes a tank, a pump, a boom assembly, and a plurality of spray nozzles carried by the boom assembly at spaced-apart locations.

Various systems of the sprayer include conduits to transfer a flow of fluid, energy, etc. along the sprayer. In some instances, as additional systems are added to the sprayer and/or a capacity of the various tanks of the sprayer increase, an envelope for which the various conduits reside may be reduced, leading to various issues, such as pinching of the conduits. Accordingly, an improved system and methods that may allow the conduits to be retained within a defined position within the envelope would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a routing system for an agricultural sprayer configured for traversing a ground surface. The agricultural sprayer includes a frame supported above the ground surface by a pair of wheel assemblies operatively joined to the frame of the sprayer defining an envelope between the wheel assemblies and the frame. The routing system includes a support configured to operably couple with the sprayer. An adaptor is configured to transfer a flow therethrough. The adaptor is at least partially positioned within the envelope and supported by the support. The adaptor has a first stiffness. A conduit has a first section operably coupled with a first portion of the adaptor and a second section operably coupled with an opposing second portion of the adaptor. The first section and the second section of the conduit are configured to transfer the flow therethrough such that the flow is serially transferred through each of the first section of the conduit, the adaptor, and the second section of the conduit. The conduit has a second stiffness that is varied from the first stiffness.

In some aspects, the present subject matter is directed to a method of assembling a routing system for an agricultural sprayer. The method includes coupling a support to a wheel assembly of a sprayer, the support extending from the wheel assembly towards a frame of the sprayer. The method also includes coupling an adaptor to the support. In addition, the method includes coupling a first section of a conduit to a first end portion of the adaptor. Lastly, the method includes coupling a second section of a conduit to a second end portion of the adaptor. A flow is serially transferred through the first section of the conduit, the adaptor, and the second section of the conduit.

In some aspects, the present subject matter is directed to a routing system for an agricultural sprayer. The system includes a support configured to be coupled with a wheel assembly. A routing bracket is operably coupled with a first portion of the support. A brace is operably coupled with a second portion of the support. A first adaptor extends through the routing bracket and the brace. A first portion of the first adaptor is configured to couple with a first section of a conduit and a second portion of the first adaptor is configured to couple with a second section of the conduit. A flow is serially transferred through each of the first section of the conduit, the adaptor, and the second section of the conduit.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
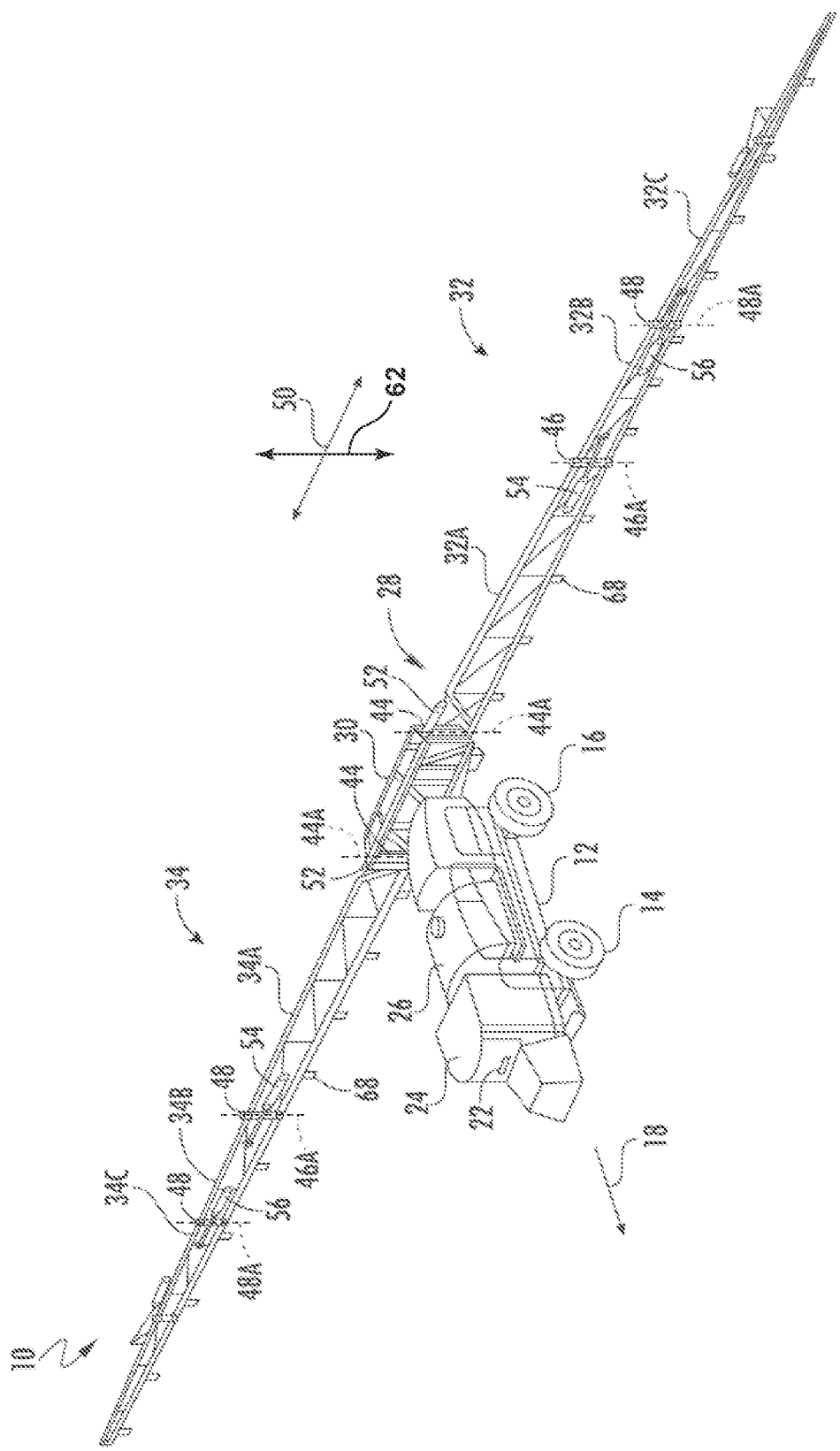
FIG. 1 illustrates a perspective view of an agricultural sprayer in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a routing system for an agricultural sprayer configured for traversing a ground surface. The sprayer can include a frame supported above the ground surface by a pair of wheel assemblies operatively joined to the frame of the sprayer. The sprayer may define an envelope between the wheel assemblies and the frame to accommodate for rotation of the wheel assemblies as a steering system rotates the wheels to alter a direction of the sprayer.

In some instances, the routing system is positioned within the envelope and includes a support configured to operably couple with the sprayer. An adaptor is configured to transfer a flow therethrough. The adaptor at least partially positioned within the envelope and supported by the support.

First and second sections of a conduit are configured to couple with opposing end portions of the adaptor to create a serial flow connection through each of the first section of the conduit, the adaptor, and the second section of the conduit. The flow connection may be configured to transfer electrical power in instances in which the conduits and the adaptors are electrical wires and/or to transfer a fluid in instances in which the conduits and the adaptors are fluid lines, hydraulic lines, etc.

In some instances, the adaptor has a first stiffness and the conduit has a second stiffness that is varied from the first stiffness. For example, in some instances, the conduits may be bent in various portions thereof while the adaptors maintain a predefined position as the steering system rotates the wheel assemblies.

In several embodiments, the routing system of the disclosed system may create a more robust design by preventing the one or more conduits of the sprayer from being pinched, which can lead to breakage during operation of the sprayer. In addition, the routing system of the present disclosure may allow for a more robust design having a narrower cross-sprayer clearance and bigger tires when compared to conventional sprayers.

Figure 2:
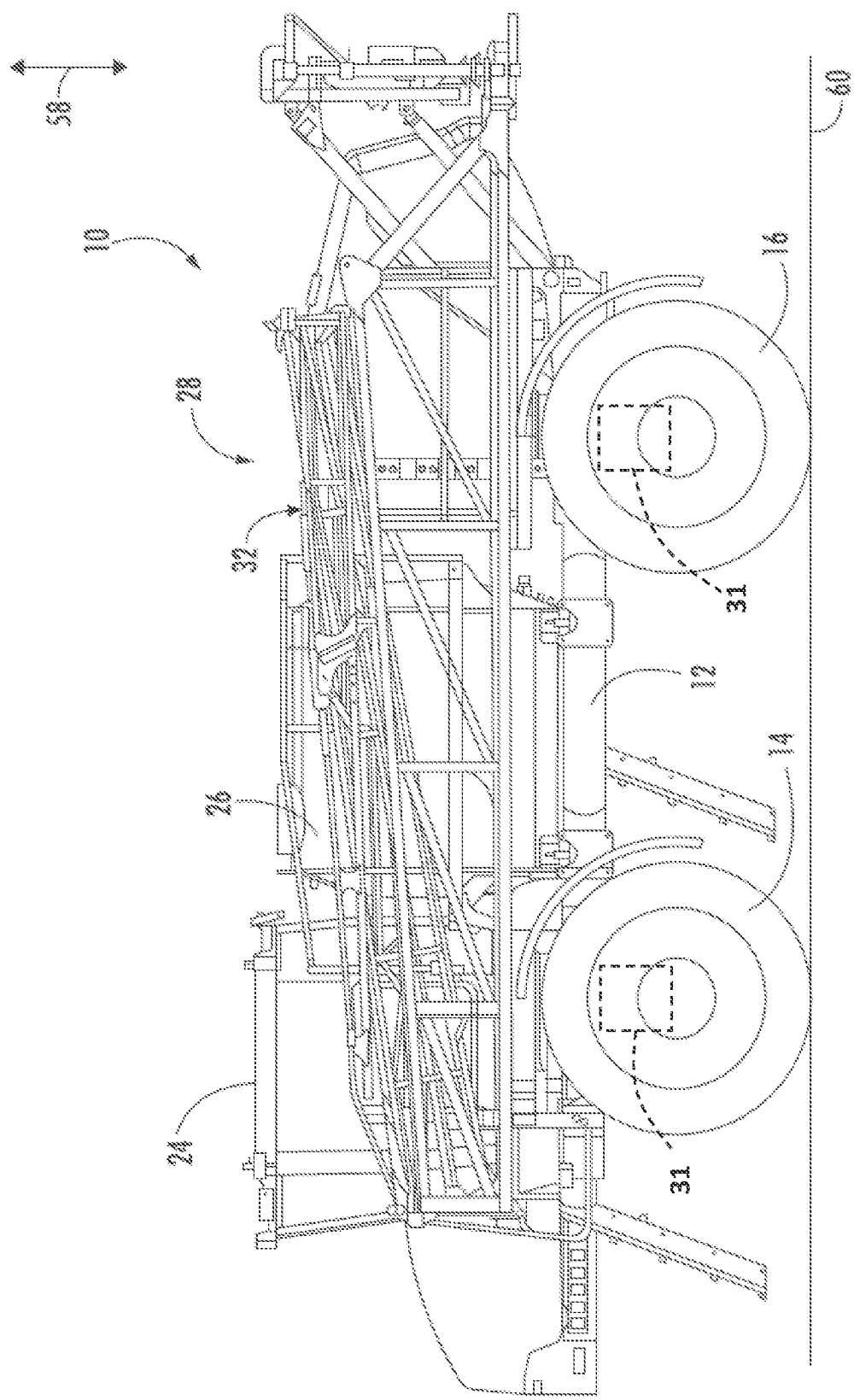
FIG. 2 illustrates a side view of the agricultural sprayer in accordance with aspects of the present subject matter.

Referring now to FIGS. 1 and 2, differing views of an agricultural sprayer 10 are illustrated in accordance with aspects of the present subject matter. Specifically, FIG. 1 illustrates a perspective view of the sprayer 10 with its boom assembly in a working or unfolded position and FIG. 2 illustrates a side view of the sprayer 10 with its boom assembly in a transport or folded position. In the illustrated embodiment, the agricultural sprayer 10 is configured as a self-propelled agricultural sprayer. However, it will be appreciated that the systems provided herein may be implemented with any other type of sprayer. Additionally or alternatively, the systems provided herein may be implemented on any other suitable type of agricultural vehicle configured to perform any type of agricultural operations without departing from the scope of the present disclosure.

As shown in FIG. 1, the agricultural sprayer 10 may include a chassis or frame 12 configured to support or couple to a plurality of components. For example, a pair of steerable front wheel assemblies 14 (one is shown) and a pair of driven rear wheel assemblies 16 (one is shown) may be coupled to the frame 12. The wheel assemblies 14, 16 may be configured to support the agricultural sprayer 10 relative to the ground and move the agricultural sprayer 10, which may be in a in a fore/aft direction (e.g., as indicated by arrow 18 in FIG. 1) across a field. In this regard, the agricultural sprayer 10 may include an engine and a transmission configured to transmit power from the engine to the wheel assemblies 14, 16. However, it should be appreciated that, in further embodiments, the front wheel assemblies 14 of the agricultural sprayer 10 may be driven in addition to or in lieu of the rear wheel assemblies 16. The frame 12 may also support an operator's cab 24 that houses various control or input devices (e.g., levers, pedals, control panels, buttons, and/or the like) for permitting an operator to control the operation of the work sprayer 10. For instance, as shown in FIG. 1, the agricultural sprayer 10 may include a human-machine or user interface 22 for displaying message windows and/or alerts to the operator and/or for allowing the operator to interface with the sprayer's controller or computing system. In some embodiments, the user interface 22 may include joysticks, buttons, knobs and/or any other suitable input devices that allow the operator to provide user inputs to an associated controller or computing system.

Furthermore, the frame 12 may also support one or more tanks 26 and a frame or boom assembly 28 mounted on the frame 12. Each tank 26 is generally configured to store or hold an agricultural product, such as a pesticide, a nutrient, and/or the like. A plurality of nozzle assemblies 68 are mounted on the boom assembly 28 and configured to selectively dispense the agricultural product stored in the associated tank 26 via nozzles onto underlying plants and/or soil. The nozzle assemblies 68 are generally spaced apart from each other on the boom assembly 28 along a lateral direction 50. Furthermore, fluid conduits may fluidly couple the nozzle assemblies 68 to the tank(s) 26. Each nozzle assembly 68 may include a nozzle valve and an associated spray tip or spray nozzle . In several embodiments, the operation of each nozzle valve may be individually controlled by an associated controller or computing system such that the valve regulates the flow rate and/or other spray characteristic of the agricultural product through the associated spray nozzle.

In some embodiments, to improve the agricultural product application quality and/or operator comfort, the sprayer 10 can be equipped with a passive, semi-active, or active suspension system 31 (FIG. 2) to dampen movement of the sprayer 10 during operation. For instance, the suspension system 31 may be configured to isolate the cab 24 and/or the boom assembly 28 from vibrations caused by uneven terrain. Such suspension system can include vibration isolators mounted between the frame 12 and the wheel assemblies 14, 16 of the sprayer 10. Passive systems use passive vibration isolators (e.g., rubber isolators, springs with friction or viscous dampers) to damp vibrations with different isolators used to damp different frequencies. Semi-active systems achieve control and isolation between the frame 12 and the cab 24 and/or boom assembly 28 by controlling a damper to selectively remove energy from the system in response to movement of the cab/boom (e.g., as monitored via sensors). Active systems use one or more sensors to sense movement and an associated controller or computing system to generate control signals for an actuator which applies a force to the cab 24 and/or boom assembly 28 to cancel vibrations transmitted to the cab/boom by the frame 12.

As shown in FIGS. 1 and 2, the boom assembly 28 of the agricultural sprayer 10 may generally be movable between a working or unfolded position (FIG. 1) and a transport or folded position (FIG. 2). In the working position, various sections of the boom assembly 28 are fully extended such that the boom assembly 28 extends over as wide a section of a field as possible. In the transport position, the various sections of the boom assembly 28 are fully retracted to reduce the width of the sprayer 10 for travel. As will be described below, the boom assembly 28 may include a plurality of fold actuators coupled between adjacent boom sections of the boom assembly 28 for moving the boom assembly 28 between the working and transport positions.

As shown in FIG. 1, in some embodiments, the boom assembly 28 includes a central boom section 30, a left boom arm 32, and a right boom arm 34. The left boom arm 32 includes a left inner boom section 32A pivotably coupled to the central boom section 30, a left middle boom section 32B pivotably coupled to the left inner boom section 32A, and a left outer boom section 32C pivotably coupled to the left middle boom section 32B. Similarly, the right boom arm 34 includes a right inner boom section 34A pivotably coupled to the central boom section 30, a right middle boom section 34B pivotably coupled to the right inner boom section 34A, and a right outer boom section 34C pivotably coupled to the right middle boom section 34B. Each of the inner boom sections 32A, 34A is pivotably coupled to the central boom section 30 at pivot joints 44. Similarly, the middle boom sections 32B, 34B are pivotally coupled to the respective inner boom sections 32A, 34A at pivot joints 46 while the outer boom sections 32C, 34C are pivotably coupled to the respective middle boom sections 32B, 34B at pivot joints 48.

As is generally understood, pivot joints 44, 46, 48 may be configured to allow relative pivotal motion between adjacent boom sections of the boom assembly 28. For example, the pivot joints 44, 46, 48 may allow for articulation of the various boom sections between a fully extended or working position (e.g., as shown in FIG. 1), in which the boom sections are unfolded along the lateral direction 50 to allow for the performance of an agricultural spraying operation, and a transport position (FIG. 2), in which the boom sections are folded inwardly to reduce the overall width of the boom assembly 28 along the lateral direction 50. It should be appreciated that, although the boom assembly 28 is shown in FIG. 1 as including a central boom section and three individual boom sections coupled to each side of the central boom sections, the boom assembly 28 may generally have any suitable number of boom sections. For example, in other embodiments, each boom arm 32, 34 may include four or more boom sections or less than three boom sections.

Additionally, as shown in FIG. 1, the boom assembly 28 may include inner fold actuators 52 coupled between the inner boom sections 32A, 34A and the central boom section 30 to enable pivoting or folding between the fully-extended working position and the transport position. For example, by retracting/extending the inner fold actuators 52, the inner boom sections 32A, 34A may be pivoted or folded relative to the central boom section 30 about a pivot axis 44A defined by the pivot joints 44. Moreover, the boom assembly 28 may also include middle fold actuators 54 coupled between each inner boom section 32A, 34A and its adjacent middle boom section 32B, 34B and outer fold actuators 56 coupled between each middle boom section 32B, 34B and its adjacent outer boom section 32C, 34C. As such, by retracting/extending the middle and outer fold actuators 54, 56, each middle and outer boom section 32B, 34B, 32C, 34C may be pivoted or folded relative to its respective inwardly adjacent boom section 32A, 34A, 32B, 34B about a respective pivot axis 46A, 48A. When moving to the transport position, the boom assembly 28 and fold actuators 52, 54, 56 are typically oriented such that the pivot axes 44A, 46A, 48A are parallel to the vertical direction 58 and, thus, the various boom sections 32A, 34A, 32B, 34B, 32C, 34C of the boom assembly 28 are configured to be folded horizontally (e.g., parallel to the lateral direction 50) about the pivot axes 44A, 46A, 48A to keep the folding height of the boom 28 as low as possible for transport. However, the pivot axes 44A, 46A, 48A may be oriented along any other suitable direction.

In some embodiments, the boom assembly 28 may include a mast coupled to a frame that, in combination, can support the boom assembly 28 relative to the sprayer frame 12. For example, the mast may be configured to couple to the frame 12 via a linkage assembly to transfer a load of the frame to the mast. Furthermore, a boom suspension 124 (FIG. 3) can extend between the frame and the mast and can be configured to dampen movement of the frame relative to the mast, thereby providing a stable platform for the boom assembly 28. In some examples, the boom suspension 124 can include one or more actuators that can be configured to mechanically interconnect the frame to the mast. The one or more actuators may be capable of generally leveling the boom assembly 28 relative to the ground surface. In addition to aiding in leveling the boom assembly 28, the adjustable suspension can also provide various damping levels and/or rigidly couple the frame and the mast to one another.

It should be appreciated that, although not shown in FIGS. 1 and 2, the sprayer 10 may also include various sensors configured to capture data indicative of one or more operating conditions or parameters associated with the performance and/or operation of the sprayer 10. For instance, in some embodiments, sensors may, for example, be installed on the boom assembly 28 to allow operating parameter/conditions associated with the boom to be monitored. However, in other embodiments, one or more sensors may be installed relative to or in association with any other suitable components, features, systems, and/or sub-systems of the sprayer 10.

Additionally, it should be appreciated that the specific configuration of the agricultural sprayer 10 described above and shown in FIGS. 1 and 2 is provided only to place the present subject matter in an exemplary field of use. In this regard, it should be apparent to those of ordinary skill in the art that the present subject matter may be readily adaptable to any manner of machine configuration that is consistent with the disclosure provided herein.

Figure 3:
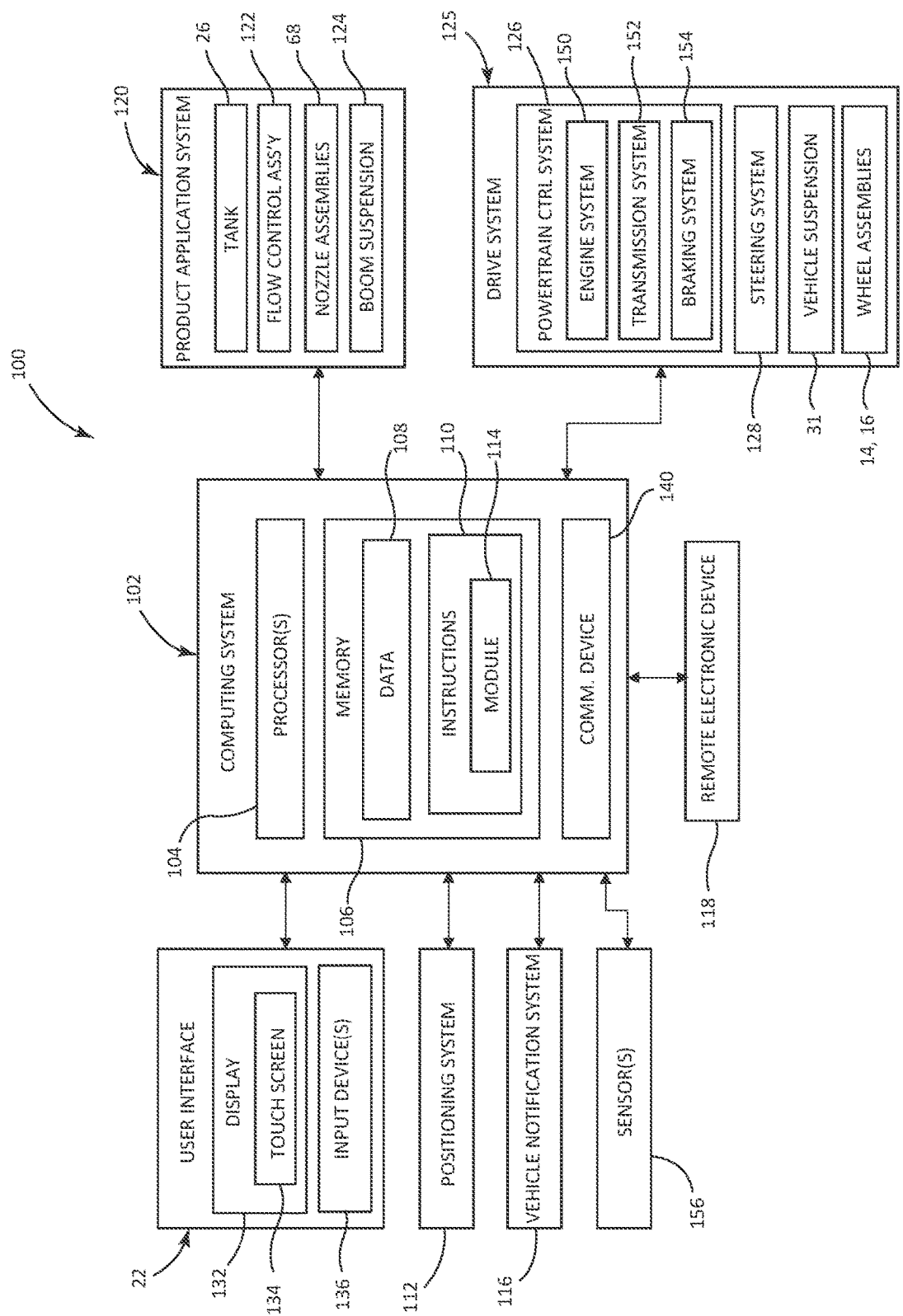
FIG. 3 illustrates a schematic view of the sprayer system in accordance with aspects of the present subject matter.

Referring now to FIG. 3, a schematic view of a sprayer system 100 configured to form part of or otherwise be associated with an agricultural sprayer 10 is illustrated in accordance with aspects of the present subject matter. In general, the system 100 will be described herein with reference to the sprayer 10 described above with reference to FIGS. 1 and 2. However, it should be appreciated that the disclosed system 100 may generally be utilized with sprayers or other agricultural applicators having any suitable configuration consistent with the disclosure provided herein.

In several embodiments, the system 100 may include a computing system 102 and various components, features, systems and/or sub-systems configured to be communicatively coupled to the computing system 102. In general, the computing system 102 may be configured to perform various computer-related functions or tasks, including, for example, receiving data from one or more components, features, systems and/or sub-systems of the sprayer 10, storing and/or processing data received or generated by the computing system 102, and/or controlling the operation of one or more components, features, systems and/or sub-systems of the sprayer 10.

In general, the computing system 102 may correspond to any suitable processor-based device(s), such as a computing device or any combination of computing devices. Thus, as shown in FIG. 3, the computing system 102 may generally include one or more processor(s) 104 and associated memory devices 106 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device 106 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device 106 may generally be configured to store information accessible to the processor(s) 104, including data 108 that can be retrieved, manipulated, created and/or stored by the processor(s) 104 and instructions 110 that can be executed by the processor(s) 104.

In several embodiments, the data 108 may be stored in one or more databases. For example, the memory device 106 may include various databases for storing data associated with the operation of the sprayer 10, such as operation data, sensor data, field data, map data, application data, agricultural product data, correlation tables, and/or the like. Such data may include, for example, information received from one or more components, features, systems and/or sub-systems of the sprayer 10. For instance, as shown in FIG. 3, the computing system 102 may be communicatively coupled to a positioning system(s) 112 that is configured determine the location of the sprayer 10 by using a GPS system, a Galileo positioning system, the Global Navigation satellite system (GLONASS), the BeiDou Satellite Navigation and Positioning system, a dead reckoning system, and/or the like. In such embodiments, the location determined by the positioning system(s) 112 may be transmitted to the computing system 102 (e.g., in the form location coordinates) and subsequently stored within a suitable database for subsequent processing and/or analysis.

Referring still to FIG. 3, in several embodiments, the instructions 110 stored within the memory device 106 of the computing system 102 may be executed by the processor(s) 104 to implement one or more modules 114, such as a data analysis module or an active control module. For example, a data analysis module may be executed or implemented by processor(s) 104 to analyze data received from one or more components, features, systems, and/or sub-systems of the sprayer 10 (e.g., sensors, etc.). Additionally, an active control module may be executed or implemented by the processor(s) 104 to provide notification instructions to the user interface 22, a related vehicle notification system 116 (e.g., including components configured to provide visual, auditory, or haptic feedback, such as lights, speakers vibratory components, and/or the like), and/or a remote electronic device 118. The active control module may also be capable of altering or adjusting the operation of one or more components, features, systems, and/or sub-systems of the sprayer 10. For instance, in some embodiments, the computing system 102 may utilize the active control module to adjust or control or the operation of one or more components of an agricultural product application system 120, such as by controlling the operation of an associated flow control assembly 122 (e.g., one or more pumps, valves, and/or the like) that regulates the supply of agricultural product between the tank 26 and the nozzle assemblies 68, by controlling the operation of the nozzle assemblies 68 (e.g., by controlling the nozzle valves using a pulse width modulation (PWM) technique), and/or by controlling any other suitable component of the agricultural product application system 120 (e.g., a boom suspension 124). In addition, various other components may be adjusted or controlled by the computing system 102 via execution or implementation of the active control module. For instance, the computing system 102 may be configured to adjust or control or the operation of one or more components, sub-systems, or systems of a sprayer drive system 125, such as by controlling the operation of a powertrain control system 126, a steering system 128, the sprayer suspension 31, and/or the like.

In some examples, the user interface 22 of the disclosed system 100 may include a display 132 having a touchscreen 134 mounted within a cockpit module, an instrument cluster, and/or any other location within the cab 24. The display 132 may be capable of displaying information related to the operation of the sprayer 10. In some embodiments, the display 132 may include an input device in the form of circuitry within the touchscreen to receive an input corresponding with a location over the display 132. Additionally, the user interface 22 may also include various other types or forms of input devices 136, such as one or more joysticks, buttons, knobs, levers, input pads, and/or the like.

In several embodiments, the computing system 102 may be configured to communicate via wired and/or wireless communication with one or more remote electronic devices 118 through a communications device 140 (e.g., a transceiver). The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services. The electronic device 118 may include a display for displaying information to a user. For instance, the electronic device 118 may display one or more user interfaces and may be capable of receiving remote user inputs associated with adjusting operating variables or thresholds associated with the sprayer 10. In addition, the electronic device 118 may provide feedback information, such as visual, audible, and tactile alerts and/or allow the operator to alter or adjust one or more components, features, systems, and/or sub-systems of the sprayer 10 through usage of the remote electronic device. It will be appreciated that the electronic device 118 may be any one of a variety of computing devices and may include a processor and memory. For example, the electronic device 118 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

Referring still to FIG. 3, the agricultural product application system 120 may be configured to dispense a product from the product tank 26 to the field via the various nozzle assemblies 68 spaced apart along the length of the boom assembly 28. In some embodiments, the flow control assembly 122 of the application system 120 can include a pump, restrictive orifices, valves, and/or the like to regulate the flow of agricultural product from the product tank 26 to the nozzle assemblies 68. In some cases, the flow control assembly 122 may regulate flow based on an analysis of one or more application variables. For instance, in cases where the sprayer 10 has received an instruction to adjusts its ground speed, the computing system 102 may adjust a flow rate of the agricultural product from the product tank 26 to the nozzle assemblies 68 through control of the flow control assembly 122 to ensure proper application of the product to the underlying field. Additionally (or alternatively), the computing system 102 may individually control the operation of each nozzle assembly 68 to ensure proper application of the product to the underlying field.

In some embodiments, the boom suspension 124 may be configured to dampen movement of the frame relative to the mast, thereby providing a more stable platform for the boom assembly 28. The boom suspension 124 may allow for various damping levels based on an operator input and/or such damping levels may be automatically altered or selected by the computing system 102 (e.g., based on data received from one or more sensors). In some embodiments, the boom suspension 124 may be automatically adjusted based on data received from another system or sub-systems of the sprayer 10 as well. For instance, the damping level of the boom assembly 28 may be adjusted based on the computing system 102 receiving instructions to alter the powertrain system 126 and/or the steering system 128 of the sprayer 10. Additionally, or alternatively, the damping level may be adjusted in response to data received from any other component, system, and/or sub-systems of the sprayer 10.

In some embodiments, the powertrain control system 126 includes an engine output control system 150, a transmission control system 152, and a braking control system 154. The engine output control system 150 is configured to vary the output of the engine to control the speed of the sprayer 10. For example, the engine output control system 150 may vary a throttle setting of the engine, a fuel/air mixture of the engine, a timing of the engine, and/or other suitable engine parameters to control engine output. In addition, the transmission control system 152 may adjust gear selection within a transmission to control the speed of the sprayer 10. Furthermore, the braking control system 154 may adjust braking force, thereby controlling the speed of the sprayer 10. While the illustrated powertrain control system 126 includes the engine output control system 150, the transmission control system 152, and the braking control system 154, it should be appreciated that alternative embodiments may include one or two of these systems, in any suitable combination. Further embodiments may include a powertrain control system 126 having other and/or additional systems to facilitate adjusting the speed of the sprayer 10.

Additionally, as shown in FIG. 3, the system 100 may also include various sensors 156 for monitoring one or more operating conditions or parameters associated with the sprayer 10, including monitoring operating conditions/parameters associated with any suitable components, systems, and/or sub-systems of the sprayer 10. Suitable sensors may include position sensors, flow sensors, pressure sensors, motion sensors (e.g., accelerometers, gyroscopes, etc.), vision sensors (e.g., cameras, LIDAR devices, etc.), radar sensors, ultrasonic sensors, and/or the like, depending on the specific operating condition(s)/parameter(s) being monitored.

Figure 4:
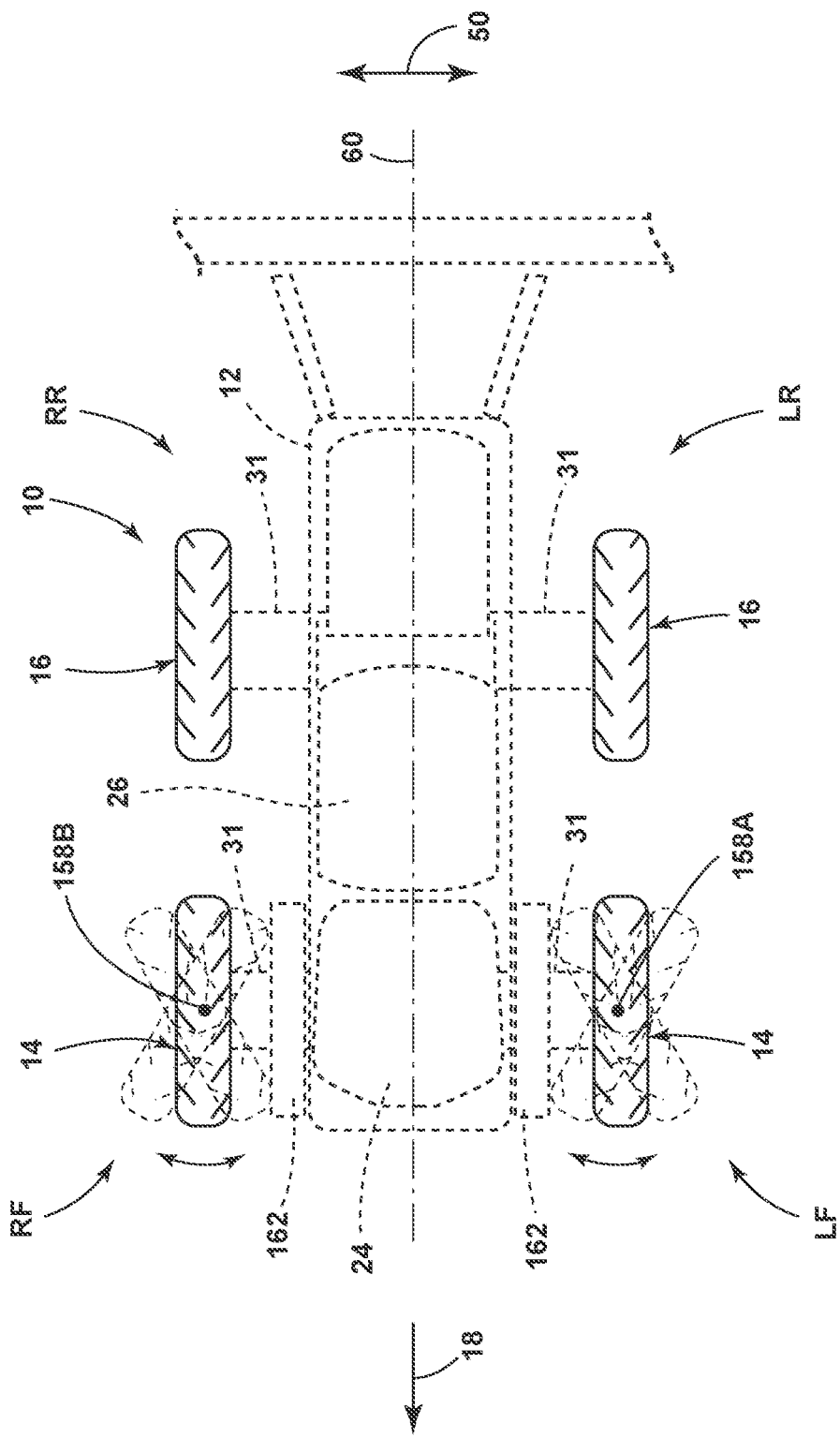
FIG. 4 is a simplified schematic representation of an envelope defined between a wheel assembly and laterally positioned components of the sprayer in accordance with aspects of the present subject matter.
Figure 5:
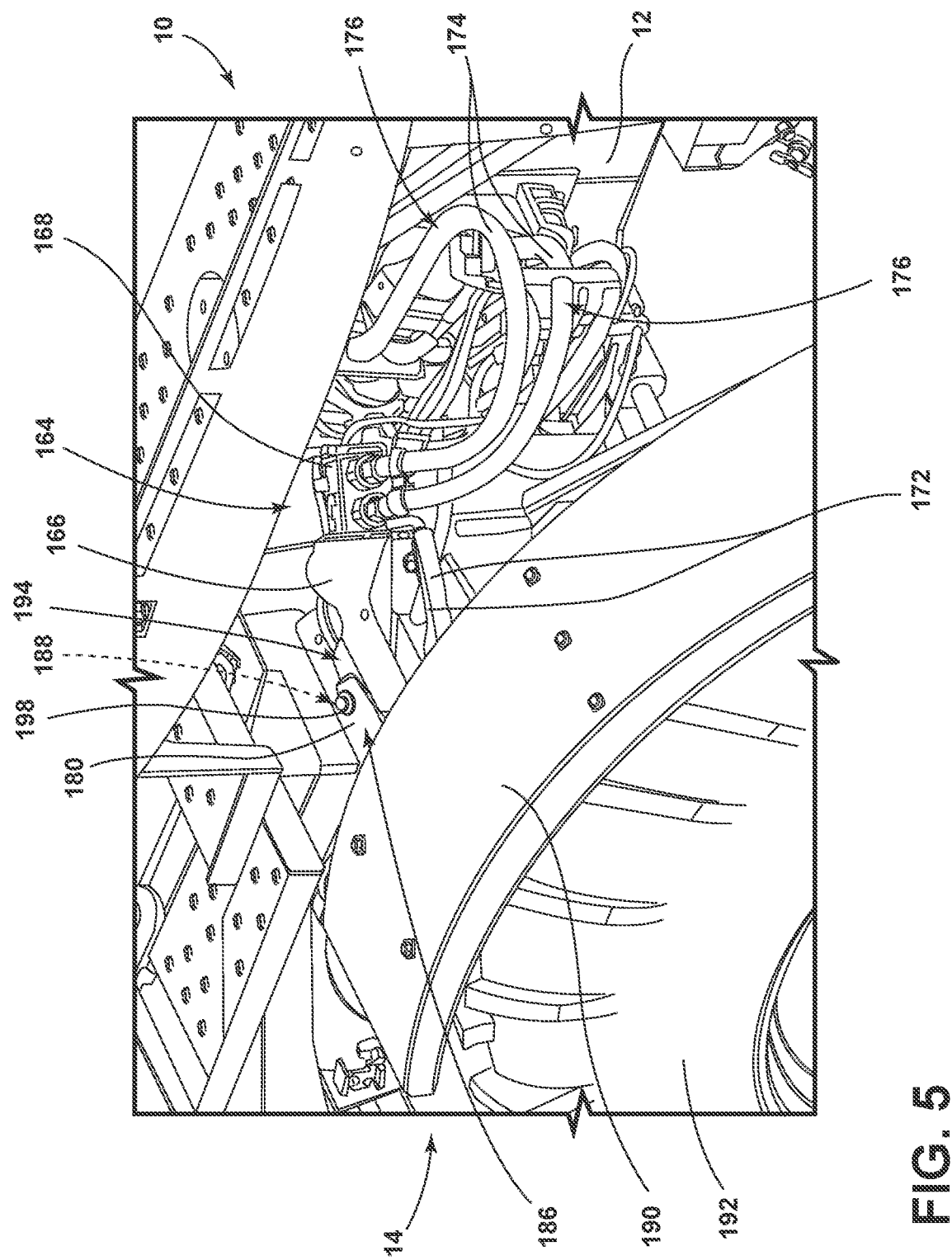
FIG. 5 is a rear perspective view of a wheel assembly of the sprayer and a routing system in accordance with aspects of the present subject matter.
Figure 6:
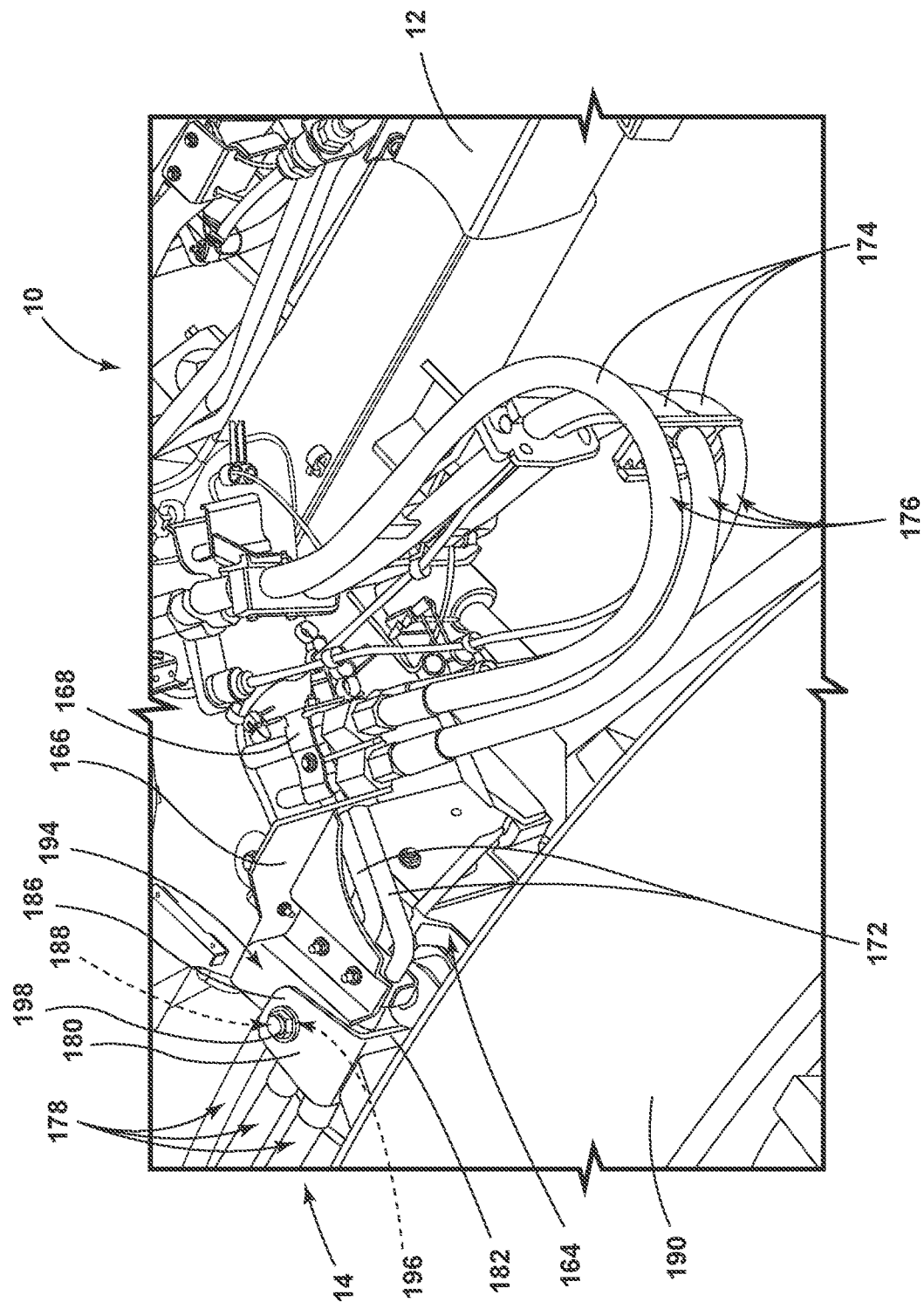
FIG. 6 is a top perspective view of a wheel assembly of the sprayer and a routing system in accordance with aspects of the present subject matter.
Figure 7:
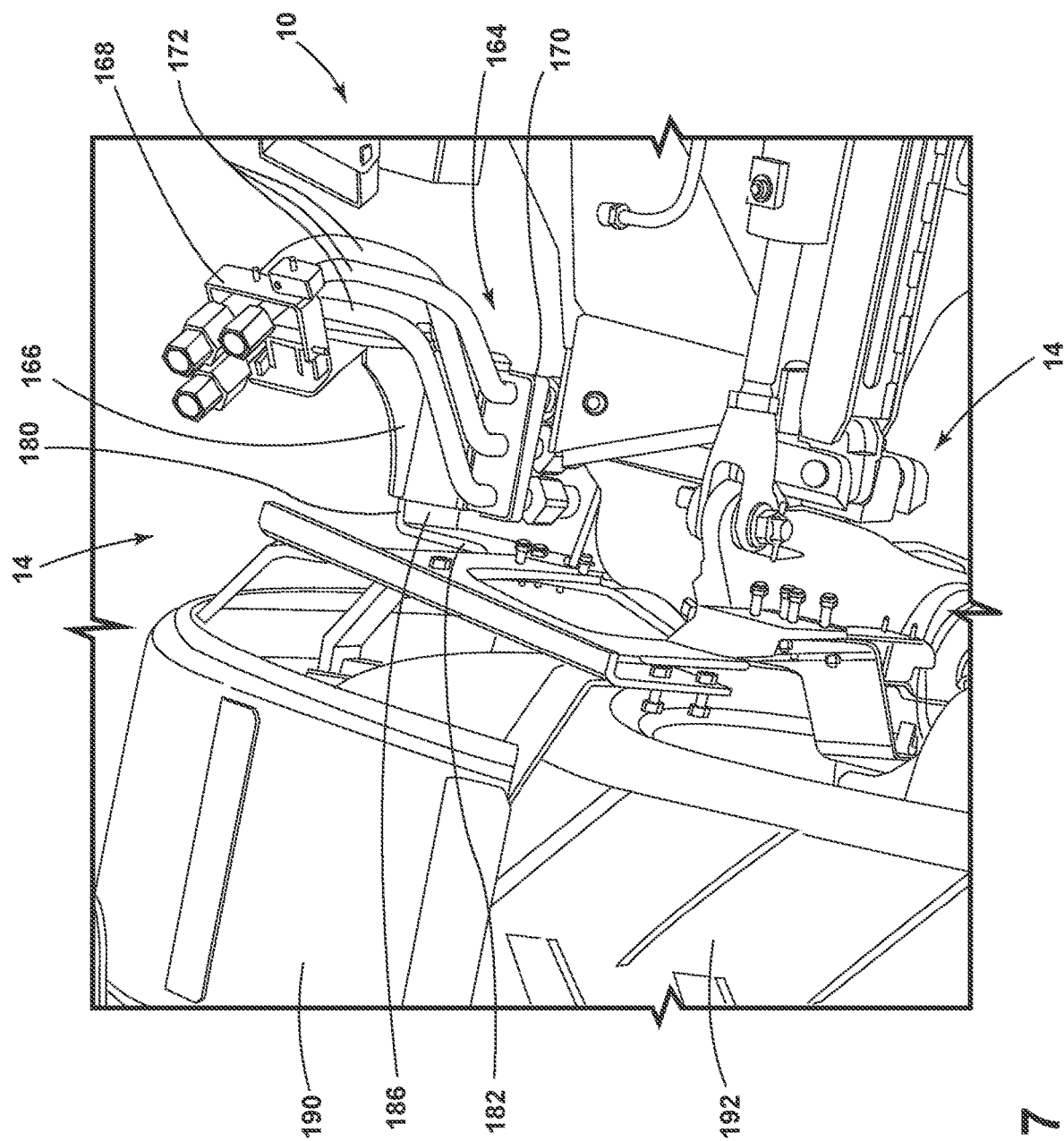
FIG. 7 is a rear perspective view of a wheel assembly of the sprayer and a routing system in accordance with aspects of the present subject matter.
Figure 8:
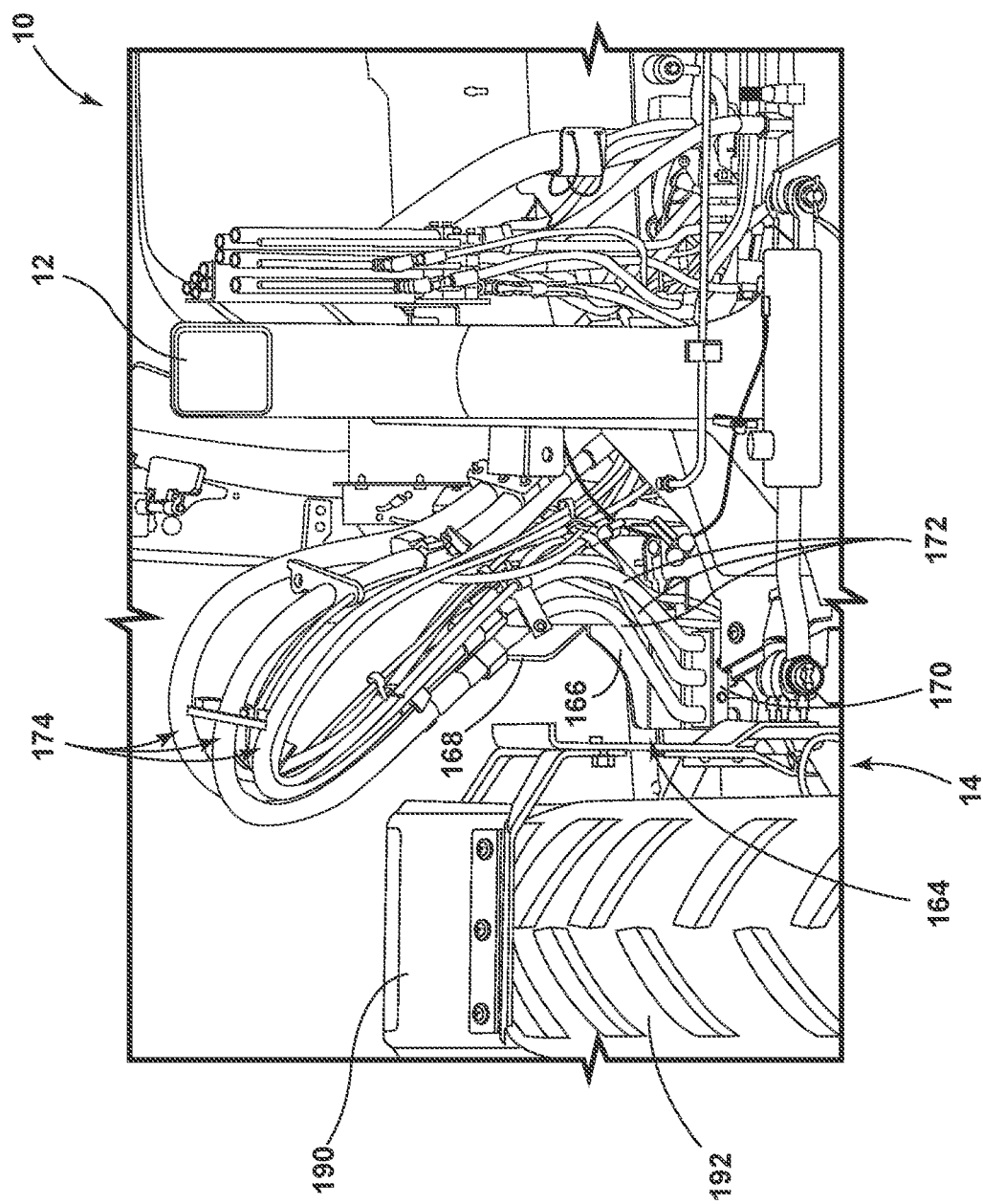
FIG. 8 is a bottom perspective view of a wheel assembly of the sprayer and a routing system in accordance with aspects of the present subject matter.
Figure 9:
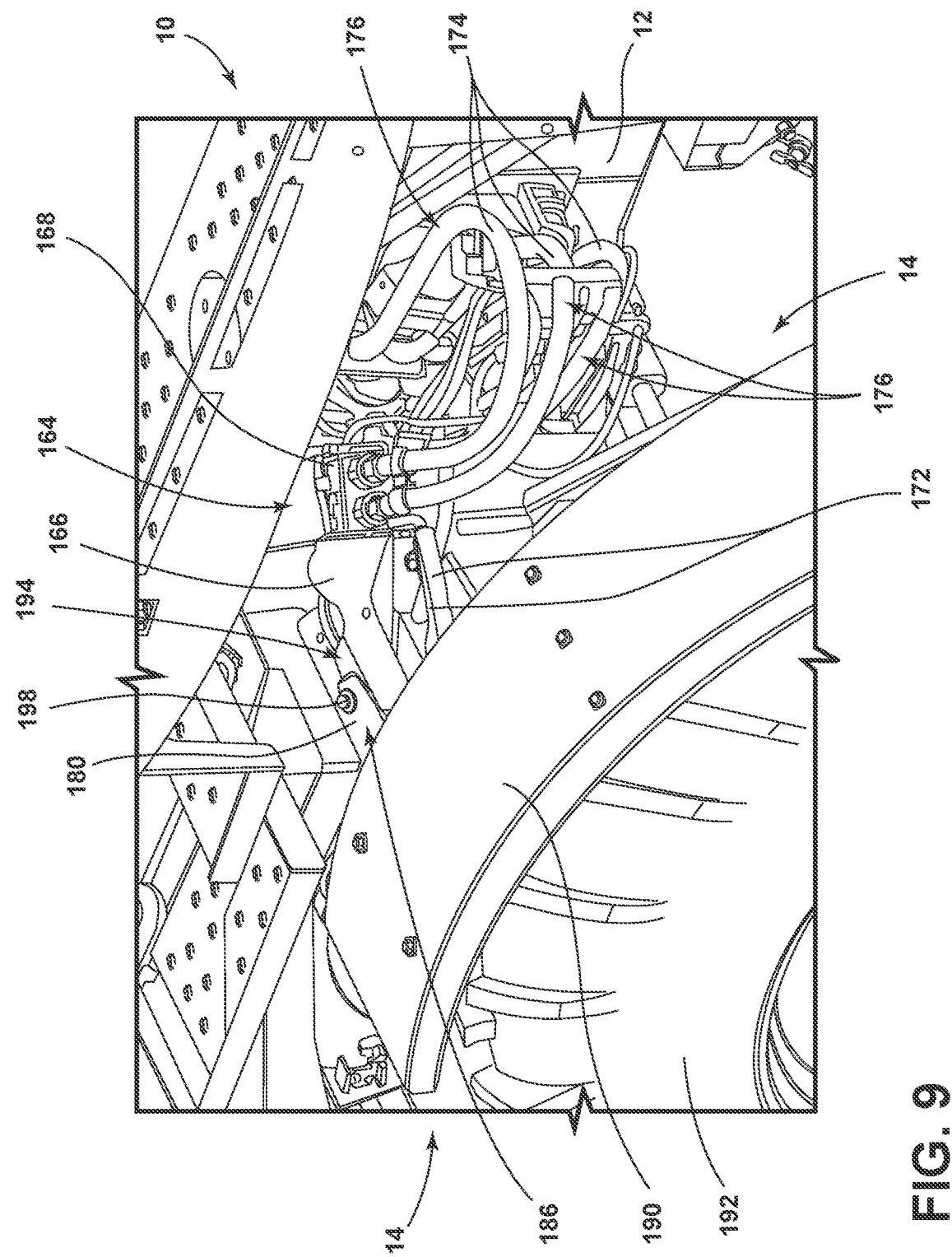
FIG. 9 is a side perspective view of a wheel assembly of the sprayer and a routing system in accordance with aspects of the present subject matter.
Figure 10:
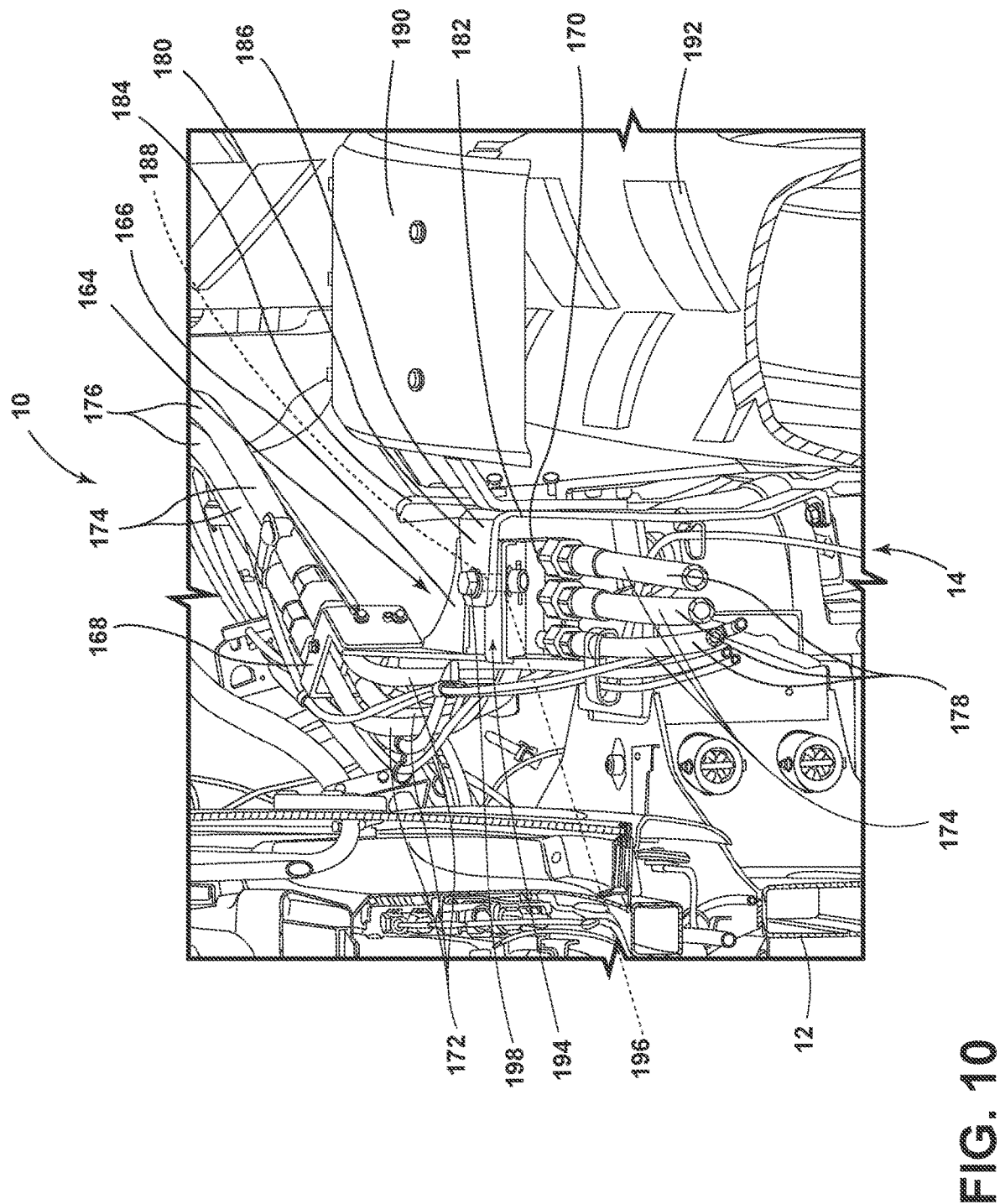
FIG. 10 is a front perspective view of a wheel assembly of the sprayer and a routing system in accordance with aspects of the present subject matter
Figure 11:
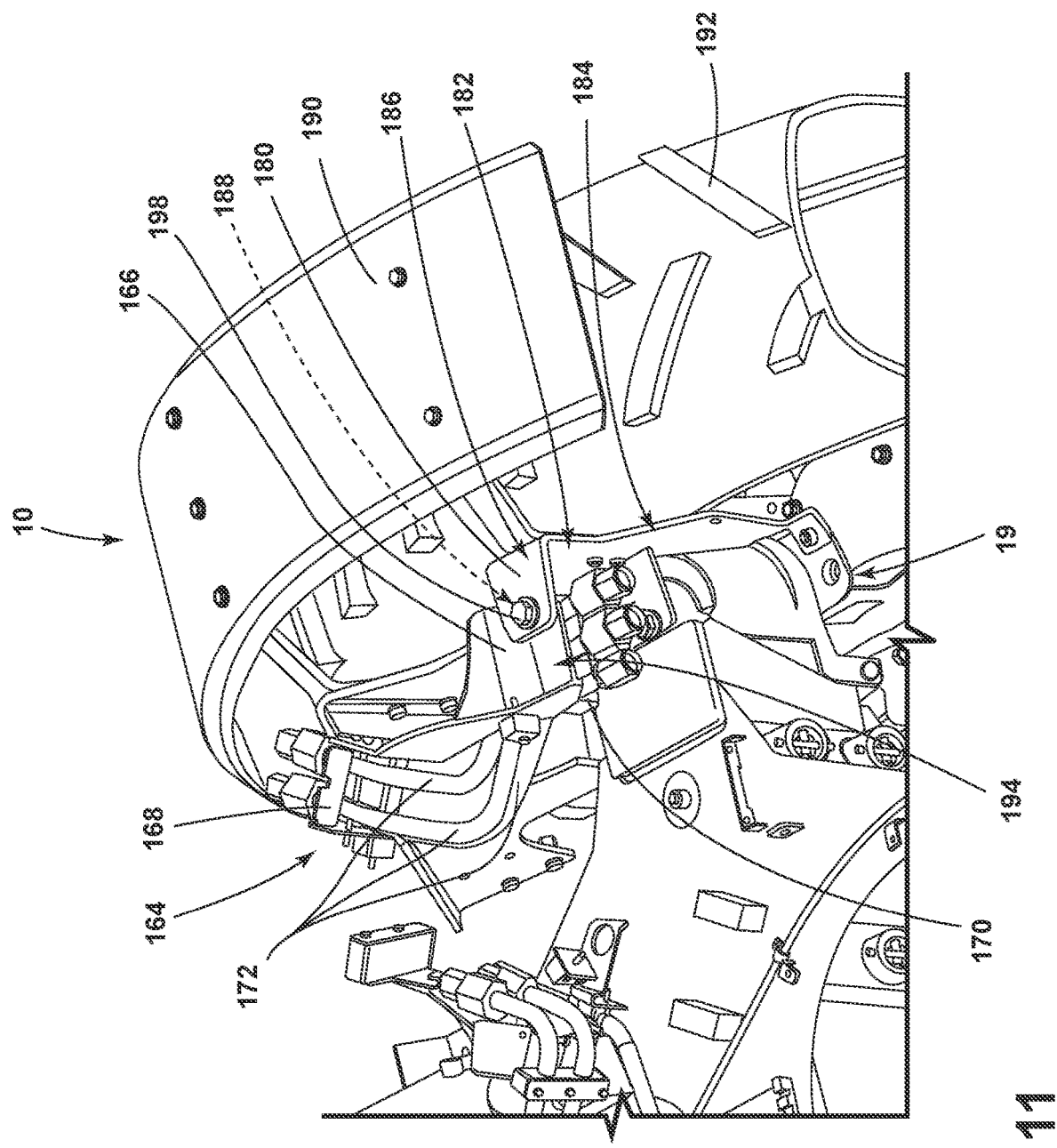
FIG. 11 is a top perspective view of a wheel assembly of the sprayer and a routing system in accordance with aspects of the present subject matter.
Figure 12:
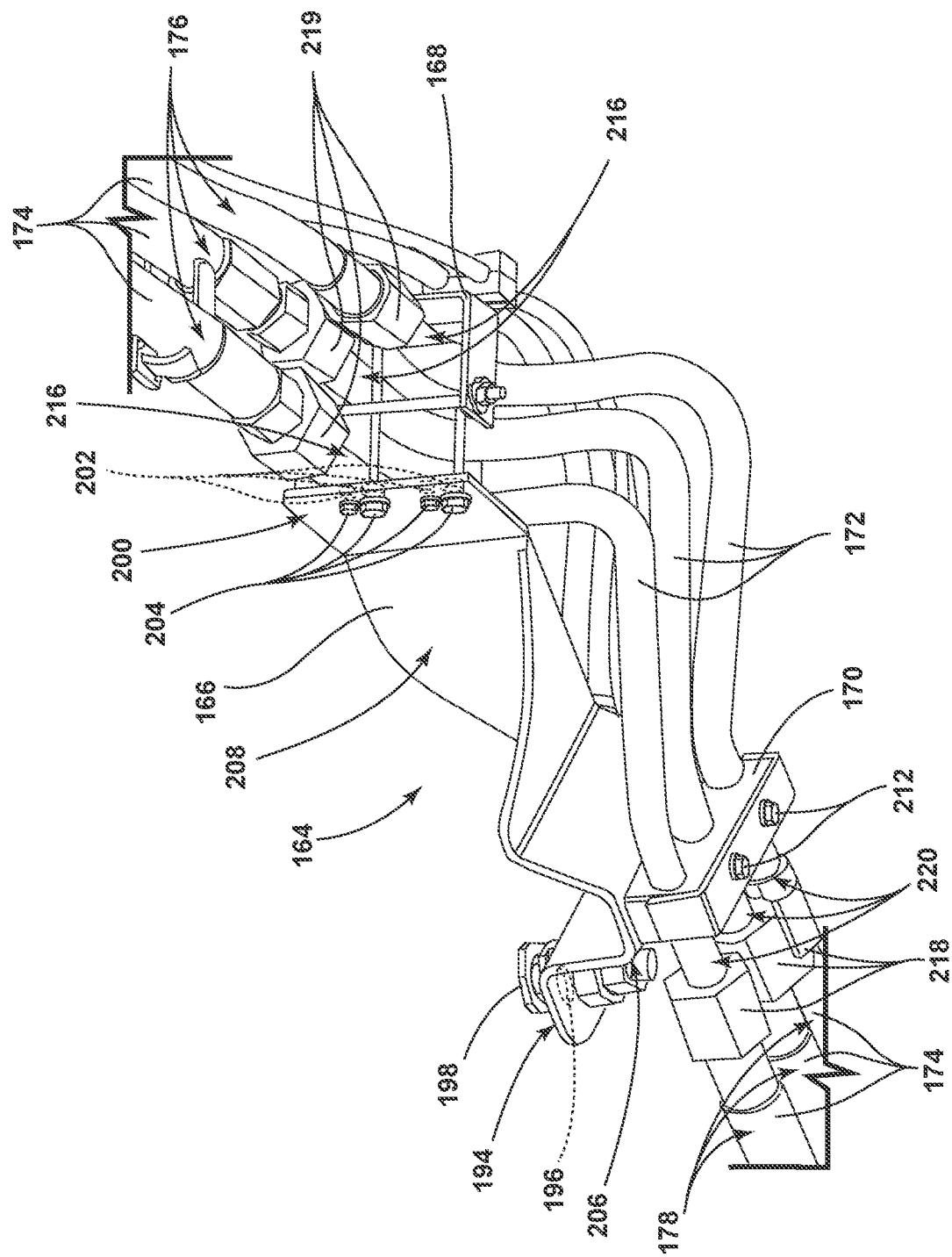
FIG. 12 is a bottom perspective view of the routing system in accordance with aspects of the present subject matter.
Figure 13:
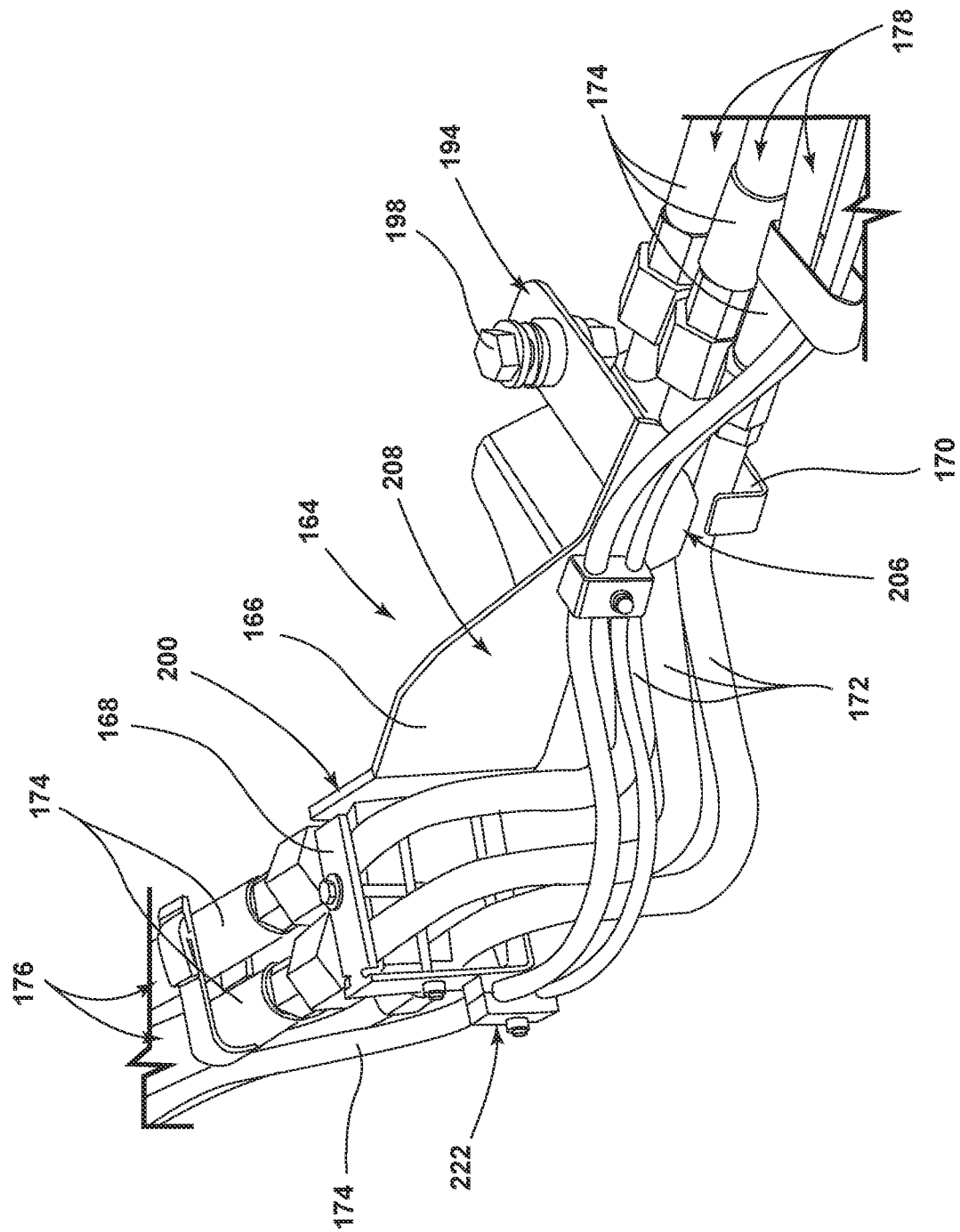
FIG. 13 is a top perspective view of the routing system in accordance with aspects of the present subject matter.

Referring to FIG. 4, a schematic view of an agricultural sprayer 10 is illustrated in accordance with aspects of the present subject matter. As shown, a centerline 60 of the sprayer 10 the frame 12 may be aligned with an axis 18 in a fore/aft direction. The centerline 60 of the sprayer 10 may generally split the frame 12 of the sprayer 10 in two mirrored halves in the in a sprayer lateral direction 50. Further, the sprayer 10 may extend in a vertical direction 62 (FIG. 1).

As illustrated in FIG. 4, a first front wheel assembly 14 may be configured as a left front LF wheel assembly and a second front wheel assembly 14 may be configured as a right front RF wheel assembly with the first and second front wheel assemblies 14 being positioned on opposing sides of the centerline 60 of the sprayer 10. Likewise, a first rear wheel assembly 16 may be configured as a left rear LR wheel assembly and a second rear wheel assembly 16 may be configured as a right rear RR wheel assembly with the first and second rear wheel assemblies 16 being positioned on opposing sides of the centerline 60 of the sprayer 10.

In general, each wheel assembly 14, 16 may include various components that are operably coupled with each respective wheel assembly 14, 16. For example, each wheel assembly 14, 16 may include various wheel assembly components 31, such as a knuckle assembly, a steering actuator system, a drive system, a suspension system, a braking control system 154, a rim, a tire 192, and/or any other assembly.

In various embodiments, the left front LF wheel assembly and the right front RF wheel assembly may be pivotable to alter a direction of the sprayer 10. Additionally or alternatively, the left rear LR wheel assembly and the right rear RR wheel assembly may be pivotable to alter a direction of the sprayer 10. As such, the sprayer 10 may be a front-steered vehicle, a rear steered vehicle, and a four wheel steered vehicle.

In embodiments where at least the front wheel assemblies 14 are pivotable, the left front LF first wheel assembly 14 can be pivotable about a first rotation axis 158A and the right front RF wheel assembly 14 is pivotable about a second rotation axis 158B. In operation, the front steering actuator system 36 can be configured to pivot the front wheel assemblies 14 about the first rotation axis 158A and the second rotation axis 158B in a common direction during a steering maneuver to define a steering direction and a steering angle.

An envelope 162 may be defined as a space between the wheel assembly 14 and the frame 12 and any other component of the sprayer 10 in a lateral, sprayer inward direction and/or in vertical direction between the wheel assembly 14 and the other components of the sprayer 10. The envelope 162 may generally ensure that the wheel assembly 14 maintains clearance from the frame 12 of the sprayer 10. The size or volume of the envelope 162 may be varied from sprayer to sprayer based on the design of the respective sprayer 10. However, in some instances, the envelope 162 may be reduced relative to commercially available sprayers as additional components are added to the sprayer and/or as various components of the sprayer become larger.

Referring now to FIGS. 5-15, various perspective views of a routing system 164 that may retain one or more conduits 174 within the envelope 162 are illustrated in accordance with aspects of the present subject matter. While FIGS. 5-15 illustrate the routing system 164 that may retain one or more conduits 174 within the envelope 162 defined between a front left wheel assembly 14 and one or more laterally inward components of the sprayer 10, such as the frame 12, it will be appreciated that any other wheel assembly 14, 16 may have a similar routing system 164. Further, it will be appreciated that any routing system 164 positioned on a left side of the sprayer centerline 60 (FIG. 4) may be made in a similar manner to the illustrated routing system 164 while any routing system 164 positioned on a right side of the sprayer centerline 60 (FIG. 4) may be mirrored to the illustrated routing system 164. Moreover, as provided herein, it will be appreciated that the sprayer 10 may additionally or alternatively be configured to have a steerable rear wheel assembly 16. In such instances, the routing system 164 may be incorporated into each of the steerable (or non-steerable) rear wheel assemblies 16 without departing from the scope of the present disclosure.

In general, the sprayer 10 may include various conduits 174 (e.g., electrical wires, fluid lines, hydraulic lines, etc.) that operably couple various components of the sprayer 10. For example, one or more conduits 174 may be directed from an engine compartment to a component that is remote from the engine compartment. However, in other examples, the one or more conduits 174 may additionally or alternatively be directed from any first element to a second element that is fore, aft, and/or generally aligned in a fore-aft direction with the first element without departing from the scope of the present disclosure.

In several embodiments, the routing system 164 of the disclosed system may create a more robust design by preventing the one or more conduits 174 of the sprayer 10 from being pinched, which can lead to breakage during operation of the sprayer 10. In addition, the routing system 164 of the present disclosure may allow for a more robust design in sprayer 10 having a narrower cross-sprayer clearance and bigger tires when compared to conventional sprayers.

Referring further to FIGS. 5-15, the illustrated routing system 164 may be configured to maintain conduits 174 within a reduced envelope 162 that are routed along the sprayer 10 in a vertical direction, a lateral direction, any other direction, and/or combinations thereof. In various examples, the routing system 164 may include a support 166, a routing bracket 168, a brace 170, and/or one or more adaptors 172 that operably connect in a flow connection first and second sections 176, 178 of each of one or more conduits 174. The routing bracket 168 and the brace 170 may be coupled with the support 166 with each of the routing bracket 168 and the brace 170 retaining the one or more adaptors 172 therein. It will be appreciated that, in some embodiments, the routing system 164 may be free of adaptors 172 such that the routing bracket 168 and the brace 170 operatively support the conduits 174 as the conduits 174 extend between the routing bracket 168 and the brace 170.

In the examples illustrated in FIGS. 5-15, the support 166 is operably coupled with a mount 180. In some instances, the mount 180 may include a first section 182 that is generally configured to be mounted along a wheel assembly bracket 184 and a second section 186 that extends sprayer inward of the wheel assembly bracket 184. The second section 186 of the mount 180 may define a fastener void 188.

In the illustrated examples, the wheel assembly bracket 184 may also support a fender 190 that extends above a tire 192 of the wheel assembly 14 from an opposing side of the wheel assembly bracket 184 from the mount 180.

In several embodiments, the support 166 includes a flange portion 194 that defines a fastener void 196. A fastener 198 can be positioned through the fastener void 196 to couple the support 166 to the wheel assembly 14. In the illustrated embodiment, the support 166 can be operably coupled with the wheel assembly 14 and can pivot relative to the frame 12 as at least a portion of the wheel assembly 14 is rotated. Alternatively, in various embodiments, the support 166 can be operably coupled with the frame 12 and maintained in a generally constant position relative to the frame 12 as at least a portion of the wheel assembly 14 is rotated.

In several embodiments, the adaptors 172 may extend in a non-linear manner from the routing bracket 168 to the brace 170. For example, the first sections 176 of the one or more conduits 174 may be a first lateral distance from the frame 12 of the sprayer 10 and the second section 178 of the one or more conduits 174 may be a second lateral distance from the sprayer 10. The second lateral distance may be greater than the first lateral distance such that the first and second sections 176, 178 of the conduits 174 are offset in a fore/aft direction. In some embodiments, the first lateral distance may be less than the second lateral distance therefore allowing for additional clearance within the envelope 162 between the wheel assembly 14 and the frame 12 and/or components supported by the frame 12 as at least a portion of the wheel assembly 14 is rotated.

As illustrated, the routing bracket 168 may be configured to route the one or more conduits 174 in a direction that is non-parallel to the wheel assembly 14 and/or the frame 12. For example, the first section 176 of the conduits 174 may extend laterally outward of the routing bracket 168 rearward of the routing bracket 168. In addition, the first sections 176 of the conduits 174 may have a bend section that is sprayer rearward of the routing bracket 168. The bend section may allow for the wheel assembly 14 to be positioned in various orientations without the conduits 174 being stretched to a length that could cause failure of the conduit 174. As illustrated, the brace 170 may be generally aligned with the fore/aft direction such that the second sections 178 of the conduits 174 are positioned in a direction that may align with the fore/aft direction 18, the frame 12, and/or the wheel assembly 14 forward of the brace 170.

Once the first and second sections 176, 178 of a conduit 174 are coupled with opposing end portions of the adaptor 172, a serial flow connection is created through each of the first section 176 of the conduit 174, the adaptor 172, and the second section 178 of the conduit 174. The flow connection may be configured to transfer electrical power in instances in which the conduits 174 and the adaptors 172 are electrical wires and/or to transfer a fluid in instances in which the conduits 174 and the adaptors 172 are fluid lines, hydraulic lines, etc.

Referring further to FIGS. 12-15, in general, the routing system 164 can include the support 166 configured to be coupled with the wheel assembly 14, the routing bracket 168 operably coupled with a first portion of the support 166, the brace 170 operably coupled with a second portion of the support 166. One or more adaptors 172 extend through the routing bracket 168 and the brace 170. Each of the one or more adaptors 172 is respectively coupled with first and second sections 176, 178 of a conduit 174.

In various embodiments, the support 166 includes a first attachment portion 200 that is configured to operably couple with the routing bracket 168. As illustrated, the first attachment portion 200 may be oriented in a generally vertical direction (e.g., as generally indicated by axis 62 in FIG. 1) such that the routing bracket 168 extends laterally inward of the support 166 when the support 166 is mounted to the sprayer 10. As illustrated, one or more fastener openings 202 may be defined through the first attachment portion 200. One or more fasteners 204 may be positioned through the fastener openings 202 to couple the routing bracket 168 to the support 166.

The support 166 further includes a second attachment portion 206 that is separated from the first by an intermediate portion 208. The intermediate portion 208 may have a nonlinear orientation in the fore/aft direction (e.g., as generally indicated by arrow 18 in FIG. 4), a lateral direction (e.g., as generally indicated by axis 50 in FIG. 4), and/or a vertical direction (e.g., as generally indicated by axis 62 in FIG. 1). In several embodiments, the non-linear orientation may increase a rigidity of the support 166.

The second attachment portion 206 that is configured to operably couple with the brace 170. As illustrated, the second attachment portion 206 may be oriented in a generally horizontal direction (e.g., aligned with the fore/aft direction (e.g., as generally indicated by axis 18 in FIG. 4) and/or the lateral direction (e.g., as generally indicated by axis 50 in FIG. 4)) such that the brace 170 extends below the support 166 (and/or the routing bracket 168) when the support 166 is mounted to the sprayer 10. As illustrated, one or more fastener openings 210 may be defined through the second attachment portion 206. One or more fasteners 212 may be positioned through the fastener openings 210 to couple the brace 170 to the support 166.

In the illustrated example, the flange portion 194 may be positioned on an opposing side of the second attachment portion 206 from the first attachment portion 200. As such, in some embodiments, the support 166 may extend further sprayer rearward of the wheel assembly rotation axis 158A, 158B than sprayer forward. In addition, as the flange portion 194 is offset from a center portion of the support 166, the support 166 may be supported in a cantilevered configured within the envelope 162. However, it will be appreciated that the support 166 may extend in a generally equal portions forward and rearwardly of the rotation axis 158A, 158B.

Alternatively, the support 166 may extend further sprayer forward of the wheel assembly rotation axis 158A, 158B than sprayer rearward.

Referring further to FIGS. 12-15, the one or more adaptors 172 may extend through the routing bracket 168 and the brace 170. Each adaptor 172 may include a first coupler 214 on a first end portion 216 of the adaptor 172 and a second coupler 218 on a second end portion 220 of the adaptor 172. A first section 176 of a conduit 174 may be operably coupled with the first coupler 214 on a first end portion 216 of the adaptor 172. A second section 178 of the conduit 174 may be operably coupled with the second coupler 218 on the second end portion 220 of the adaptor 172. The first couplers 214 and the second couplers 218 may be made of a metallic material, such as steel, brass, stainless steel, aluminum, a polymeric material, a composite material, and/or any other practicable material. In addition, when the conduit 174 and the adaptor 172 are configured as a flow connection for a fluid, the first coupler 214 and the second coupler 218 may be any type of fluid coupler, including but not limited to an O-ring coupler, mated angle coupler, or threaded coupler. When the conduit 174 and the adaptor 172 are configured as a flow connection for an electric current, the first coupler 214 and the second coupler 218 may be any type of electrical coupler, including but not limited to a plug and socket coupler, a jack and a plug, a crimp-on coupler, a soldered coupler, an insulation-displacement coupler, a binding post, a screw terminal, a ring and spade coupler, and/or a blade coupler.

In various examples, the coupling of the first and second sections 176, 178 of the conduit 174 to the adaptor 172 can allow for a serial flow connection through each of the first section 176 of the conduit 174, the adaptor 172, and the second section 178 of the conduit 174. As discussed herein, the flow connection may be configured to transfer electrical power in instances in which the conduits 174 and the adaptors 172 are electrical wires and/or to transfer a fluid in instances in which the conduits 174 and the adaptors 172 are fluid lines, hydraulic lines, etc.

In several embodiments, the routing system 164 may retain a plurality of conduits 174 through respective adaptors 172. For example, a first conduit 174 may include a first portion operably coupled with a first coupler 214 of a first adaptor 172 and a second portion operably coupled with the second coupler 218 of a first adaptor 172. A second conduit 174 may include a first portion operably coupled with the first coupler 214 of a second adaptor 172 and a second portion operably coupled with the second coupler 218 of the second adaptor 172. A third conduit 174 may include a first portion operably coupled with the first coupler 214 of a third adaptor 172 and a second portion operably coupled with the second coupler 218 of the third adaptor 172. The flow connection of each respective adaptor 172 and conduit 174 may be configured to transfer electrical power in instances in which the conduits 174 and the adaptors 172 are electrical wires and/or to transfer a fluid in instances in which the conduits 174 and the adaptors 172 are fluid lines, hydraulic lines, etc.

In various embodiments, each of the adaptors 172 may be formed from a material, such as a metallic material, an elastomeric material, a polymeric material, a composite material, and/or any other practicable material, having a first stiffness. For example, the first stiffness may have a Young's modulus of between 500 pascals-100,000 pascals. Any of the conduits 174 may be formed from a material, such as a metallic material, an elastomeric material, a polymeric material, a composite material, and/or any other practicable material, having a second stiffness, which may be varied from the first stiffness. For example, the second stiffness may have a Young's modulus of between 1 pascal-10,000 pascals.

In some embodiments, such as the those illustrated in FIGS. 12-15, the routing system 164 may further include a retainer 222. The retainer 222 may be configured to maintain one or more conduits 174 there though. As discussed above, the various conduits 174 may include electrical wires, fluid lines, hydraulic lines, etc. that operably couple various components of the sprayer 10.

Figure 14:
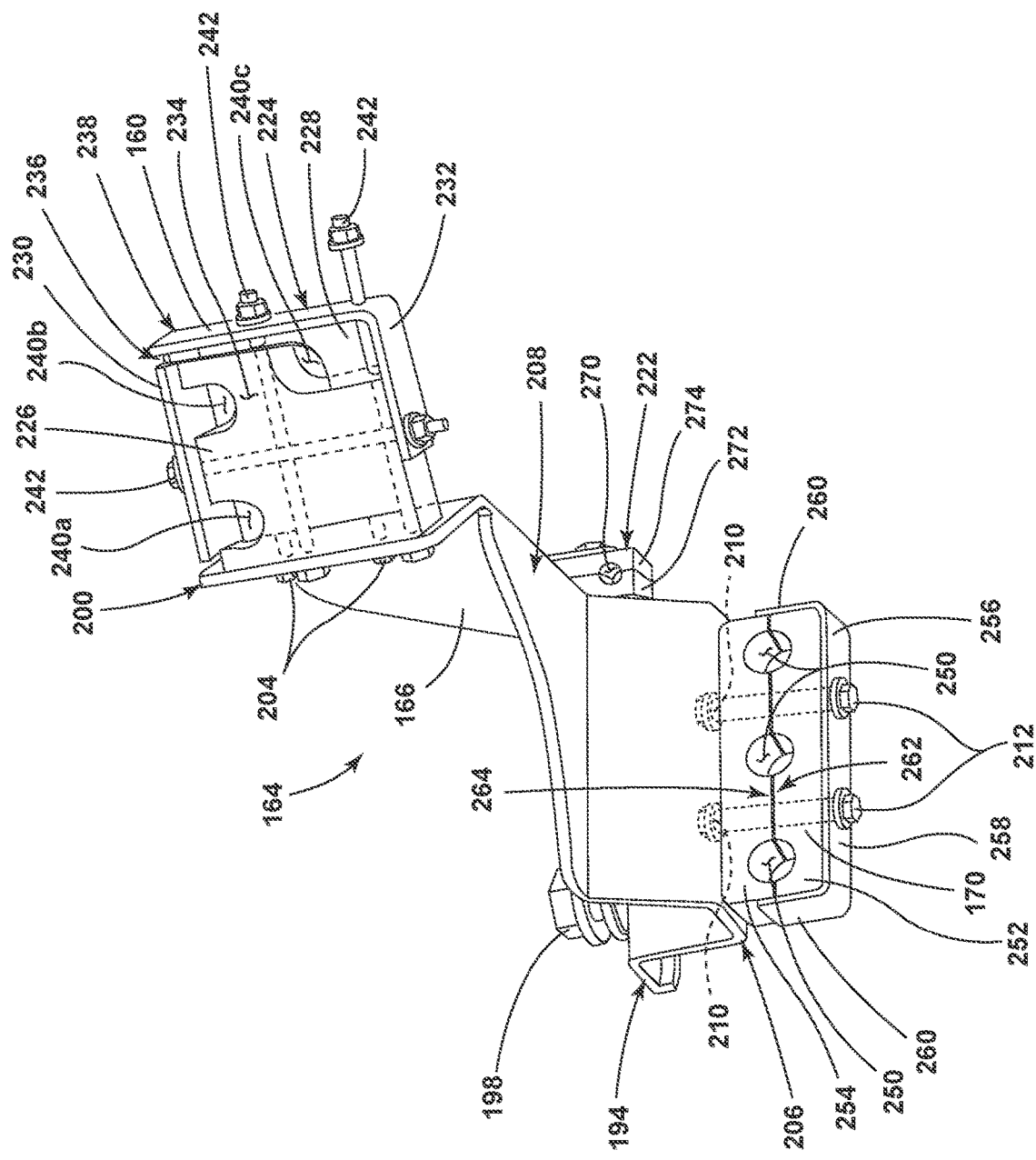
FIG. 14 is a rear perspective view of the routing system in accordance with aspects of the present subject matter.
Figure 15:
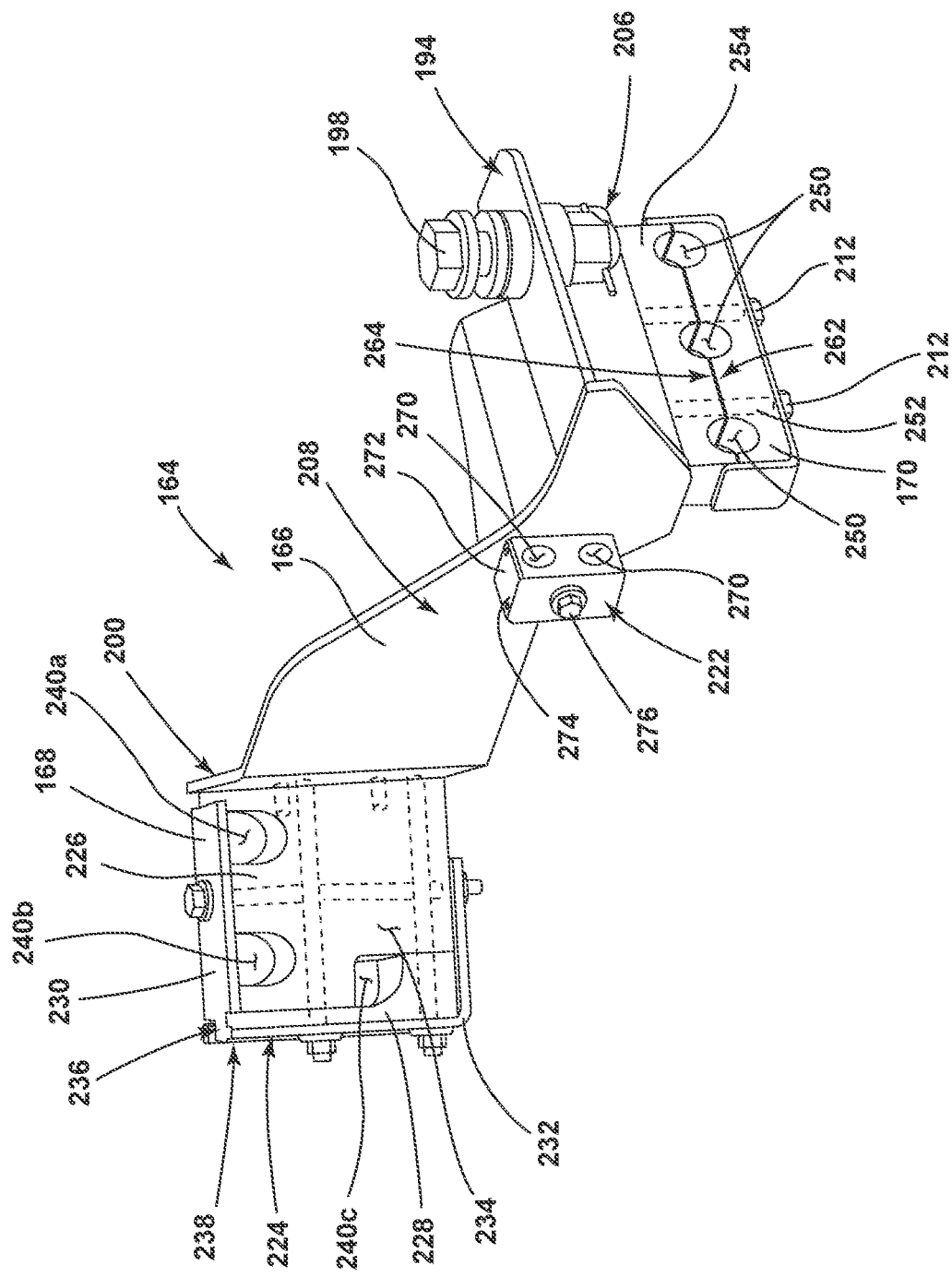
FIG. 15 is a front perspective view of the routing system in accordance with aspects of the present subject matter.

Referring now to FIGS. 14 and 15, front and rear perspective views of the support 166 having the routing bracket 168, the brace 170, and the retainer 222 attached thereto are respectively illustrated in accordance with various aspects of the present disclosure. As illustrated, the routing bracket 168 can include a peripheral structure 224 and one or more retention blocks 226, 228 that, in combination, may be configured to retain the one or more adaptors 172. The peripheral structure 224 may be formed from one or more substrates 230, 232 that may be retained in a fixed position relative to one another to define a void 234 therein. In some examples, the first substrate 230 may include a male locator 236 and the second substrate 232 may include a female locator 238 to align the first and second substrate 230, 232 to one another. In several examples, the peripheral structure 224 may be formed from a metallic material, an elastomeric material, a polymeric material, a composite material, and/or any other practicable material.

The one or more retention blocks 226, 228 may be at least partially surrounded by the peripheral structure 224. The one or more retention blocks 226, 228 and/or the peripheral structure 224 define one or more openings 240a, 240b, 240c through which a respective conduit 174 is positioned. For example, first and second openings 240, 240b may be defined by a first retention block 226 and the peripheral structure 224. A third opening 240c may be defined between the first retention block 226 and a second retention block 228. In various examples, the one or more retention blocks 226, 228 may be formed from a metallic material, an elastomeric material, a polymeric material, a composite material, and/or any other practicable material. It will be appreciated that the routing system 164 may include any number of retention blocks 226, 228 that may be positioned within the peripheral structure 224 and/or externally of the peripheral structure 224 without departing from the scope of the present disclosure.

As generally illustrated in FIGS. 14 and 15, one or more fasteners 242, 244, 246 may be used to retain the retention blocks 226, 228 and the substrates 230, 232 of the peripheral structure 224 in a fixed relationship relative to one another. In addition, the one or more fasteners may operably couple the routing bracket 168 to the first attachment portion 200 of the support 166. For example, a first set of fasteners 242 may extend through the peripheral structure 224, the first and second retention blocks 226, 228 and operably couple with the support 166, and/or any other structure of the sprayer 10. A second fastener 244 may generally extend in a perpendicular direction to any of the first set of fasteners 242 (or in any other direction) from a top portion of the peripheral structure 224, through the first retention block 226, and through a bottom portion of the peripheral structure 224. A third set of fasteners 246 may extend through the first attachment portion 200 of the support 166 and into the first retention block 226.

In various embodiments, each retention block 226, 228 may include a locking feature to facilitate assembly by maintaining the block 226, 228 in a predefined relationship relative to one another and/or any other component, such as the peripheral structure 224.

Referring further to FIGS. 14 and 15, the brace 170 may be coupled with the support 166 and/or any other component of the sprayer 10. As illustrated, in various examples, the brace 170 may define one or more cavities 250 through which an adaptor 172 extends. In some examples, the brace 170 may include a first segment 252 that is positioned at least partially above one or more of the adaptors 172 and a second segment 254 that is positioned at least partially below the one or more adapters. In some embodiments, the first segment 252 and the second segment 254 are configured to collectively define the one or more cavities 250.

In addition, the brace 170 may include a plate 256 having a body portion 258 that is positioned on an opposing side of the second segment 254 from the first segment 252 of the brace 170. As illustrated, the body portion 258 of the plate 256 may extend along a surface of the second segment 254 that is sprayer downward and/or on an opposite side of the second segment 254 from the first segment 252 of the brace 170. The plate 256 may also include a pair of side portions 260 that extend from the body towards the first segment 252 of the brace 170. In some instances, the side portions 260 may have a height that is greater than a height of the second segment 254 such that the side portions 260 extend past a contact surface of the first segment 252 and the second segment 254 of the brace 170. In addition, the side portions 260 may extend at least partially upward (or downward) the one or more cavities 250 that are defined by the first segment 252 and the second segment 254 of the brace 170.

The second segment 254 and/or the plate 256 of the brace 170 may be affixed to the first segment 252 (or the support 166) by one or more fasteners or through any other method. The one or more fasteners may also extend through fastener openings defined by the second attachment portion 206 of the support 166 to affix the brace 170 to the support 166.

Referring still to FIGS. 14 and 15, the retainer 222 may be coupled with the support 166 and/or any other component of the sprayer 10. As illustrated, in various examples, the retainer 222 may define one or more channels 250 through which a conduit 174 extends. In some examples, the retainer 222 may include a first segment 272 that is positioned at least partially laterally outward of one or more of the conduits 174 and a second segment 274 that is positioned at least partially laterally inward of the one or more conduits 174. The second segment 274 may be affixed to the first segment 272 by one or more fasteners 276 or through any other method. The one or more fasteners 276 may also extend through fastener openings defined by the second attachment portion 206 of the support 166 to affix the brace 170 to the support 166.

In some examples, the retainer 222 may define one or more retainment channels 250. The retainment channels 250 may be offset from the openings 240a, 240b, 240c of the routing bracket 168 and/or the one or more cavities 250 of the brace 170 in a fore/aft direction and/or a lateral direction.

As provided herein, each of the routing bracket 168 and the brace 170 may be coupled with the support 166 such that the routing bracket 168 and brace 170 each rotate with the support 166. Moreover, the support 166 may be rotatable with the wheel assembly 14 of the sprayer 10 such that the support 166, the routing bracket 168, the routing bracket 168, and the retainer 222 each rotate with at least one wheel assembly 14 of the sprayer 10 when at least a portion of the wheel assembly 14 is rotated about a rotation axis 158A, 158B. Accordingly, the routing system 164 described herein may allow for a more robust routing of one or more conduits 174 along the sprayer 10 that assists in preventing a pinch condition of the conduit 174 within the envelope 162 as at least a portion of the wheel assembly 14 is rotated about the rotation axis 158A.

Figure 16:
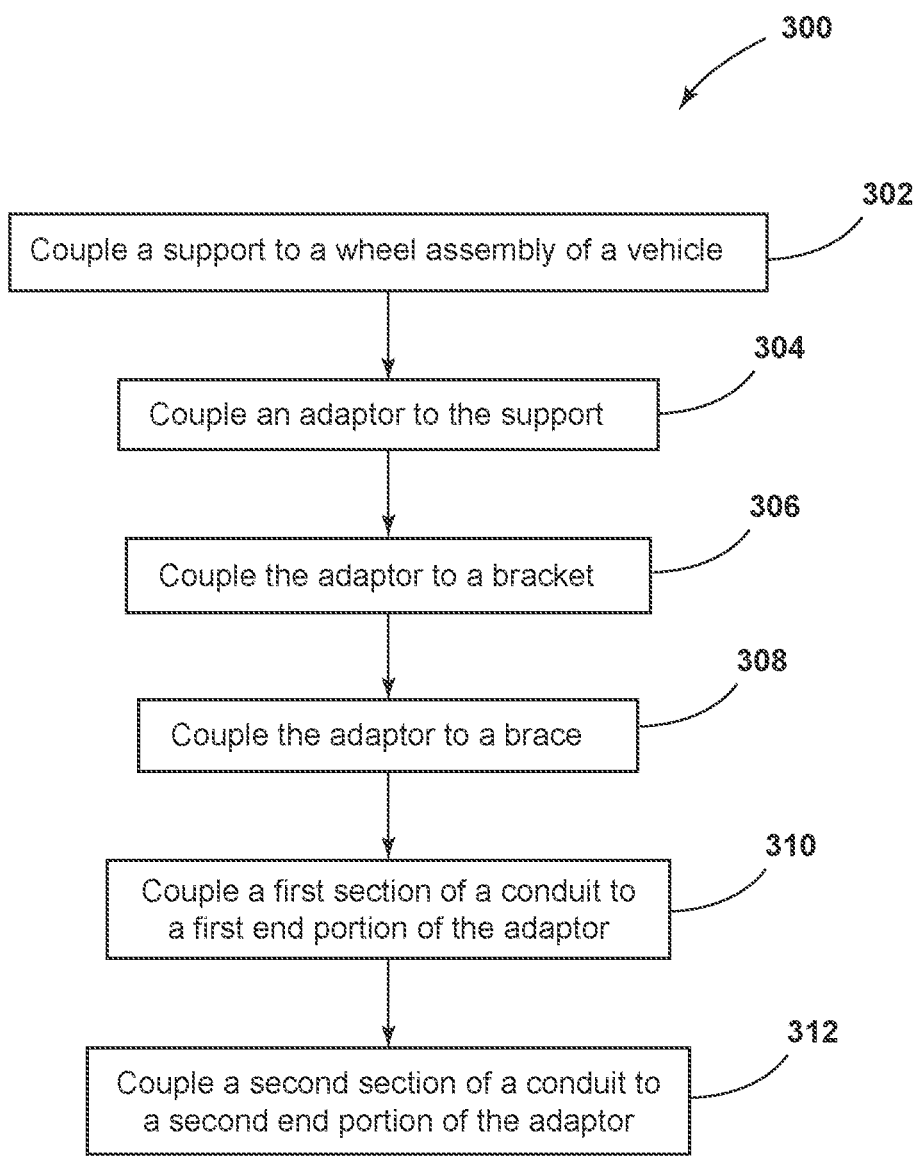
FIG. 16 illustrates a flow diagram of a method of assembling a routing system for an agricultural sprayer in accordance with aspects of the present subject matter.

Referring now to FIG. 16, a flow diagram of some embodiments of a method 300 for the operation of a product system is illustrated in accordance with aspects of the present subject matter. In general, the method 300 will be described herein with reference to the sprayer 10, the sprayer system 100, and the routing system 164 described above with reference to FIGS. 1-15. However, it will be appreciated by those of ordinary skill in the art that the disclosed method 300 may generally be utilized with any suitable agricultural sprayer 10 and/or may be utilized in connection with a system having any other suitable system configuration. In addition, although FIG. 16 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 16, at (302), the method 300 includes coupling a support to a wheel assembly of a sprayer. In some instances, the support extends from the wheel assembly towards a frame of the sprayer.

At (304), the method 300 includes coupling an adaptor to the support. The adaptor is configured to allow for the flow of electrical power and/or fluid through the adaptor. In some instances, the coupling of the adaptor to the support at (306), includes coupling a routing bracket to the support. In some instances, the routing bracket is coupled to the support by coupling a peripheral structure of a routing bracket to a first attachment portion of the support. In addition, one or more retention blocks are positioned within the peripheral structure. One or more fasteners are extended through the peripheral structure and the one or more retention blocks. In such instances, coupling the adaptor to the routing bracket can also include positioning the adaptor through an opening defined between the one or more retention blocks and the peripheral structure. In some instances, the one or more retention blocks can include a first retention block and a second retention block. The first retention block can have a varied geometry from the second retention block.

In addition, in some instances, the coupling of the adaptor to the support at (308) also includes coupling the adaptor to a brace. In some instances, the adaptor is coupled to the brace by positioning a second portion of the adaptor between the first segment of the brace and a second segment of the brace and fastening the second segment of the brace to the first segment of the brace.

At (310), the method 300 includes coupling a first section of a conduit to a first end portion of the adaptor. Similarly, at (312), the method 300 includes coupling a second section of a conduit to a second end portion of the adaptor. Like the adaptor, the conduit is configured to transfer electrical power and/or a fluid therethrough. As such, a flow is serially transferred through the first section of the conduit, the adaptor, and the second section of the conduit when the first and second sections of the conduit are coupled with opposing end portions of the adaptor.

As provided herein, when the sprayer is in operation, the support may rotate with a wheel assembly. The support, in turn rotates the adaptor with the wheel assembly, which may minimize a pinch risk of one or more conduits positioned thorough an envelope 162 of the sprayer.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A routing system for an agricultural sprayer configured for traversing a ground surface including a frame supported above the ground surface by a pair of wheel assemblies operatively joined to the frame of the sprayer defining an envelope between the wheel assemblies and the frame, the routing system comprising:
   a support configured to operably couple with the sprayer, wherein the support rotates with at least one of the wheel assemblies of the pair of wheel assemblies as the at least one of the wheel assemblies moves from a first position to a second position;
   an adaptor configured to transfer a flow therethrough, the adaptor at least partially positioned within the envelope and supported by the support, wherein the adaptor has a first stiffness;
   a conduit having a first section operably coupled with a first portion of the adaptor and a second section operably coupled with an opposing second portion of the adaptor, wherein the first section and the second section of the conduit are configured to transfer the flow therethrough such that the flow is serially transferred through each of the first section of the conduit, the adaptor, and the second section of the conduit, and wherein the conduit has a second stiffness that is varied from the first stiffness; and
   a routing bracket operably coupled with a first attachment portion of the support, the routing bracket configured to retain the first portion of the adaptor.

2. The system of claim 1, wherein the routing bracket further comprises:
   a peripheral structure including one or more substrates;
   one or more retention blocks at least partially surrounded by the peripheral structure; and
   one or more fasteners extending through at least a portion of the peripheral structure and the one or more retention blocks.

3. The system of claim 2, wherein one or more openings are defined between the one or more retention blocks and the peripheral structure.

4. The system of claim 2, wherein the one or more retention blocks includes a first retention block and a second retention block, and wherein one or more openings are defined between the first retention block and the second retention block.

5. The system of claim 1, wherein the support includes a flange portion that defines a fastener void, and wherein a fastener is positioned through the fastener void to couple the support to one of the pair of wheel assemblies.

6. The system of claim 1, further comprising:
   a brace operably coupled with a second attachment portion of the support, the brace configured to retain the second portion of the adaptor.

7. The system of claim 6, wherein the brace includes a first segment configured to be positioned at least partially above the adaptor and a second segment configured to be positioned at least partially below the adaptor, and wherein the first segment and the second segment are configured to collectively define a cavity, the second portion of the adaptor is configured to be positioned through the cavity.

8. The system of claim 1, wherein the support is operably coupled with one of the pair of wheel assemblies and is configured to pivot relative to the frame as at least a portion of the one of the pair of wheel assemblies is rotated.

9. A method of assembling a routing system for an agricultural sprayer, the method comprising:
   coupling a support to a wheel assembly of a sprayer, the support extending from the wheel assembly towards a frame of the sprayer, wherein the support rotates with the wheel assembly as the wheel assembly moves from a first position to a second position;
   coupling an adaptor to the support;
   coupling a first section of a conduit to a first end portion of the adaptor;
   coupling a second section of the conduit to a second end a portion of the adaptor, wherein a flow is serially transferred through the first section of the conduit, the adaptor, and the second section of the conduit;
   coupling a peripheral structure of a routing bracket to a first attachment portion of the support; and
   coupling the adaptor to the routing bracket.

10. The method of claim 9, further comprising:
    positioning one or more retention blocks within the peripheral structure; and
    extending one or more fasteners through the peripheral structure and the one or more retention blocks, wherein coupling the adaptor to the routing bracket includes positioning the adaptor through an opening defined between the one or more retention blocks and the peripheral structure.

11. The method of claim 10, wherein the one or more retention blocks includes a first retention block and a second retention block, the first retention block having a varied geometry from the second retention block.

12. The method of claim 9, further comprising:
coupling a first segment of a brace to a second portion of the support;
positioning a second portion of the adaptor between the first segment of the brace and a second segment of the brace; and
fastening the second segment of the brace to the first segment of the brace.

13. The method of claim 9, wherein the support is configured to pivot relative to the frame when at least a portion of the wheel assembly is rotated.

\* \* \* \* \*